Dec. 14, 1948.                    V. BENDIX                    2,456,485
                         HELICOPTER WITH COAXIAL ROTORS
Filed Nov. 23, 1943                                    15 Sheets-Sheet 1
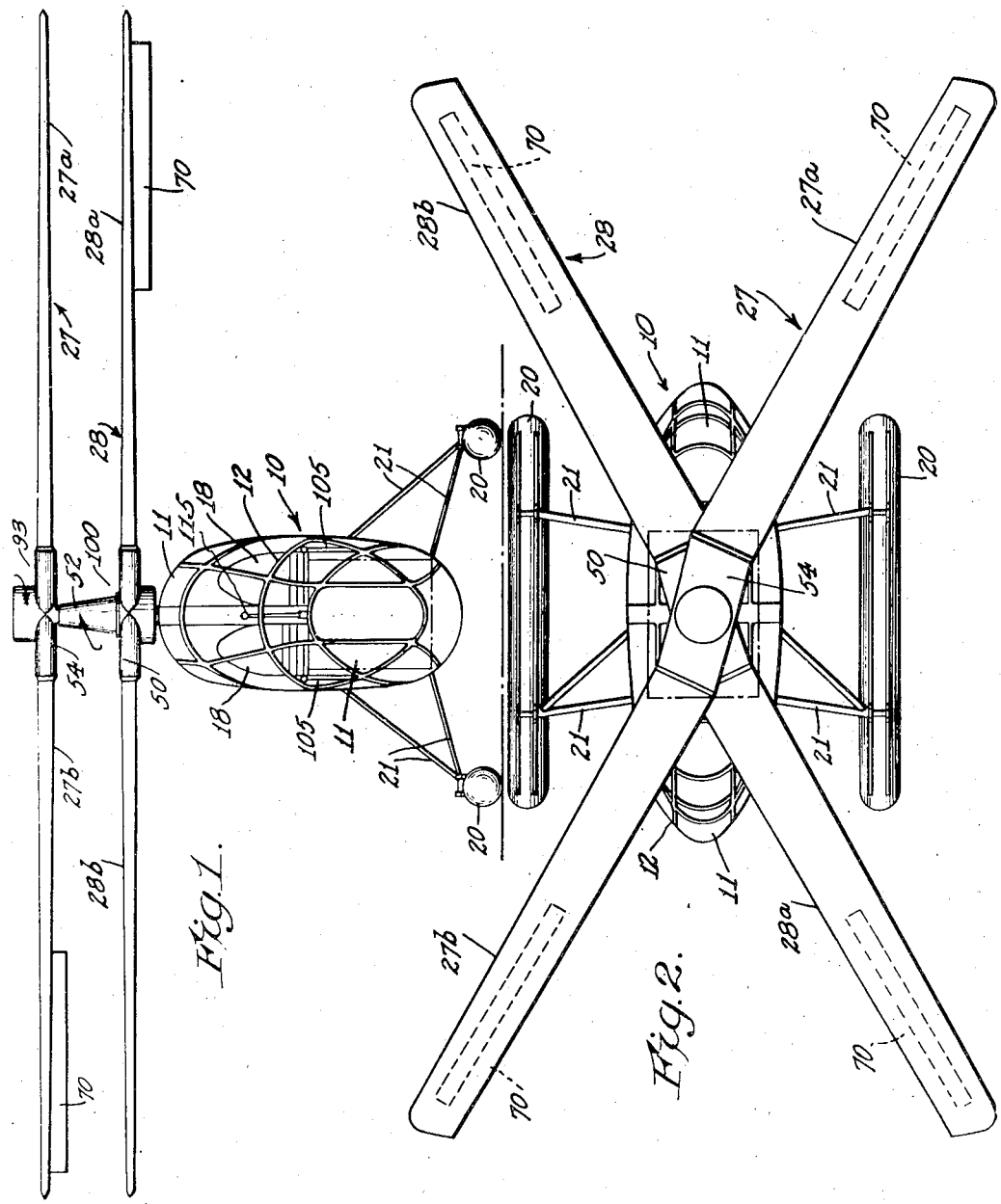
INVENTOR.
VINCENT BENDIX
BY
his ATTORNEYS Dec. 14, 1948. V. BENDIX 2,456,485
HELICOPTER WITH COAXIAL ROTORS
Filed Nov. 23, 1943 15 Sheets-Sheet 2

INVENTOR.
VINCENT BENDIX
BY
his ATTORNEYS

Dec. 14, 1948.　　　　　V. BENDIX　　　　　2,456,485
HELICOPTER WITH COAXIAL ROTORS
Filed Nov. 23, 1943　　　　　　　　　　　　　15 Sheets-Sheet 3

INVENTOR.
VINCENT BENDIX
BY Hogust, Henry & Campbell
his ATTORNEYS

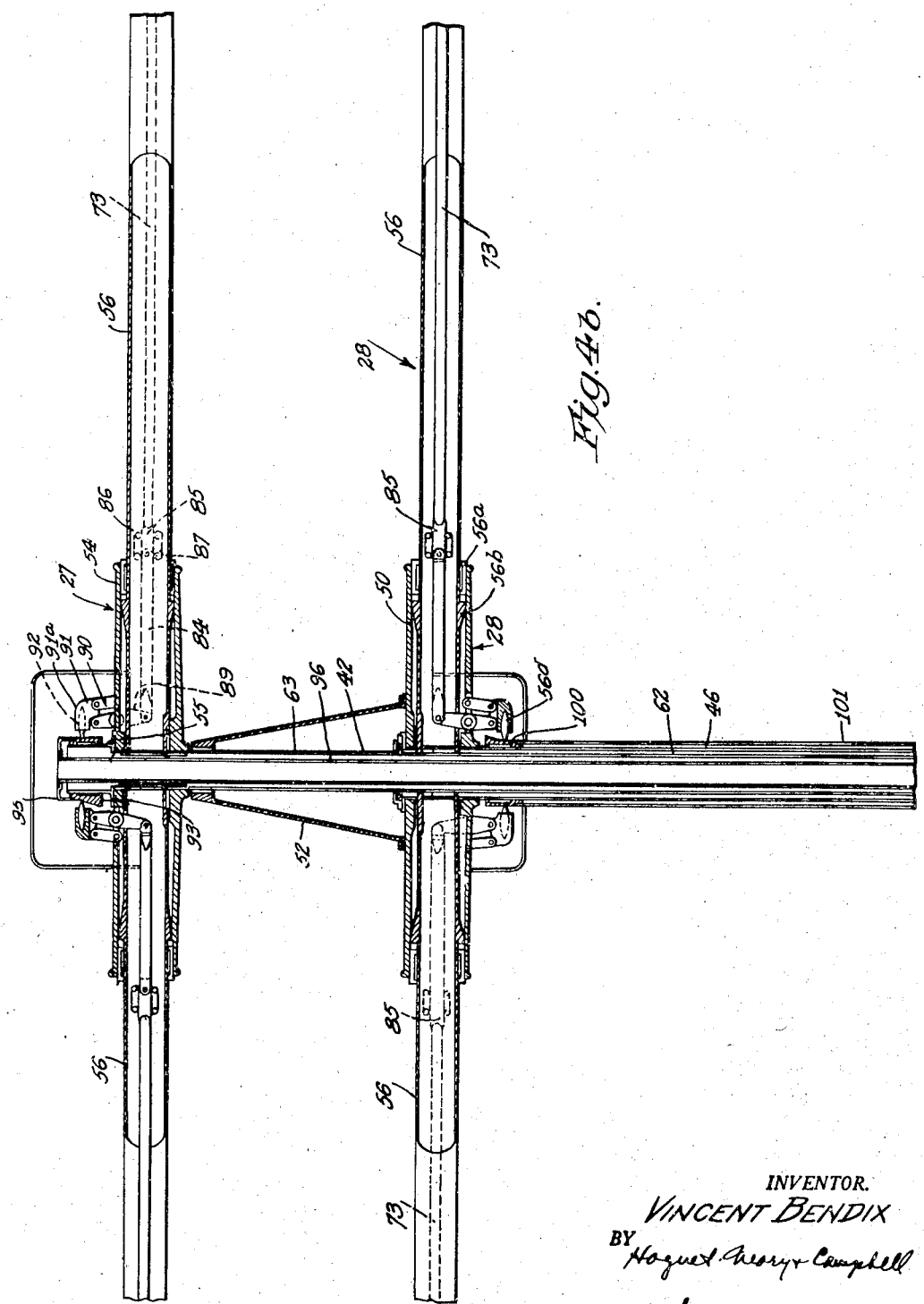

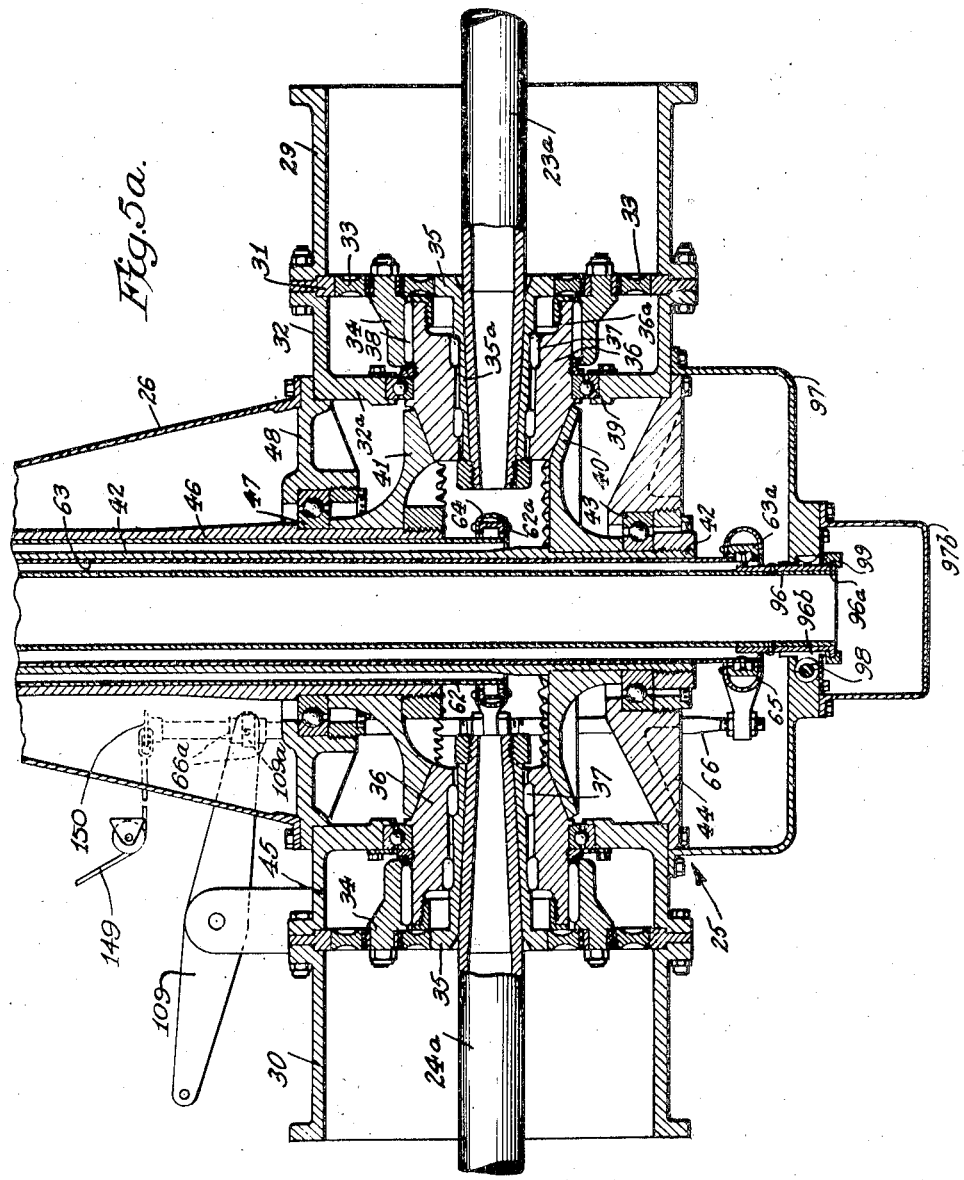

Dec. 14, 1948.　　　　　V. BENDIX　　　　　2,456,485
HELICOPTER WITH COAXIAL ROTORS
Filed Nov. 23, 1943　　　　　　　　　　　　15 Sheets-Sheet 6
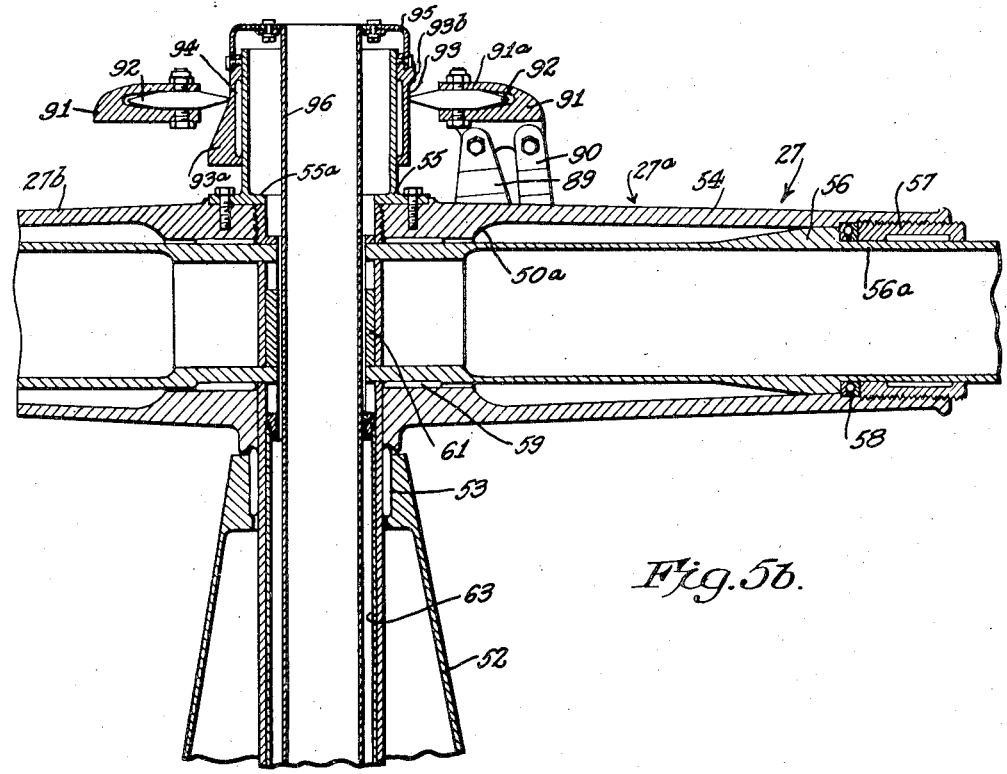
Fig.5b.
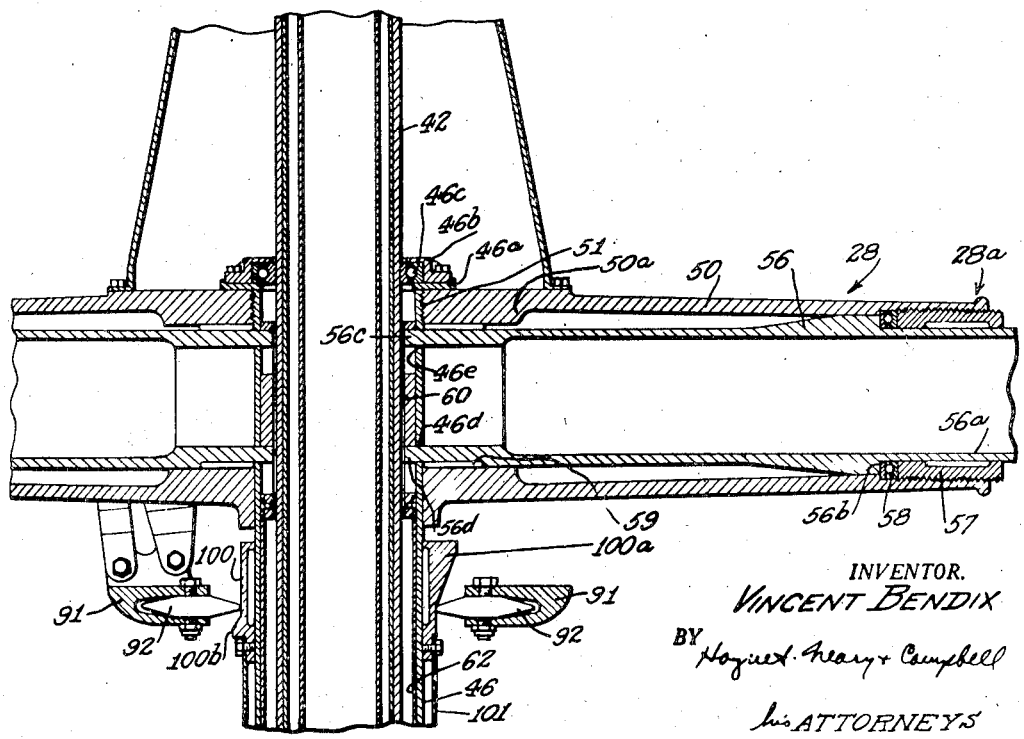
INVENTOR.
VINCENT BENDIX
BY Hoquet Geary + Campbell
his ATTORNEYS

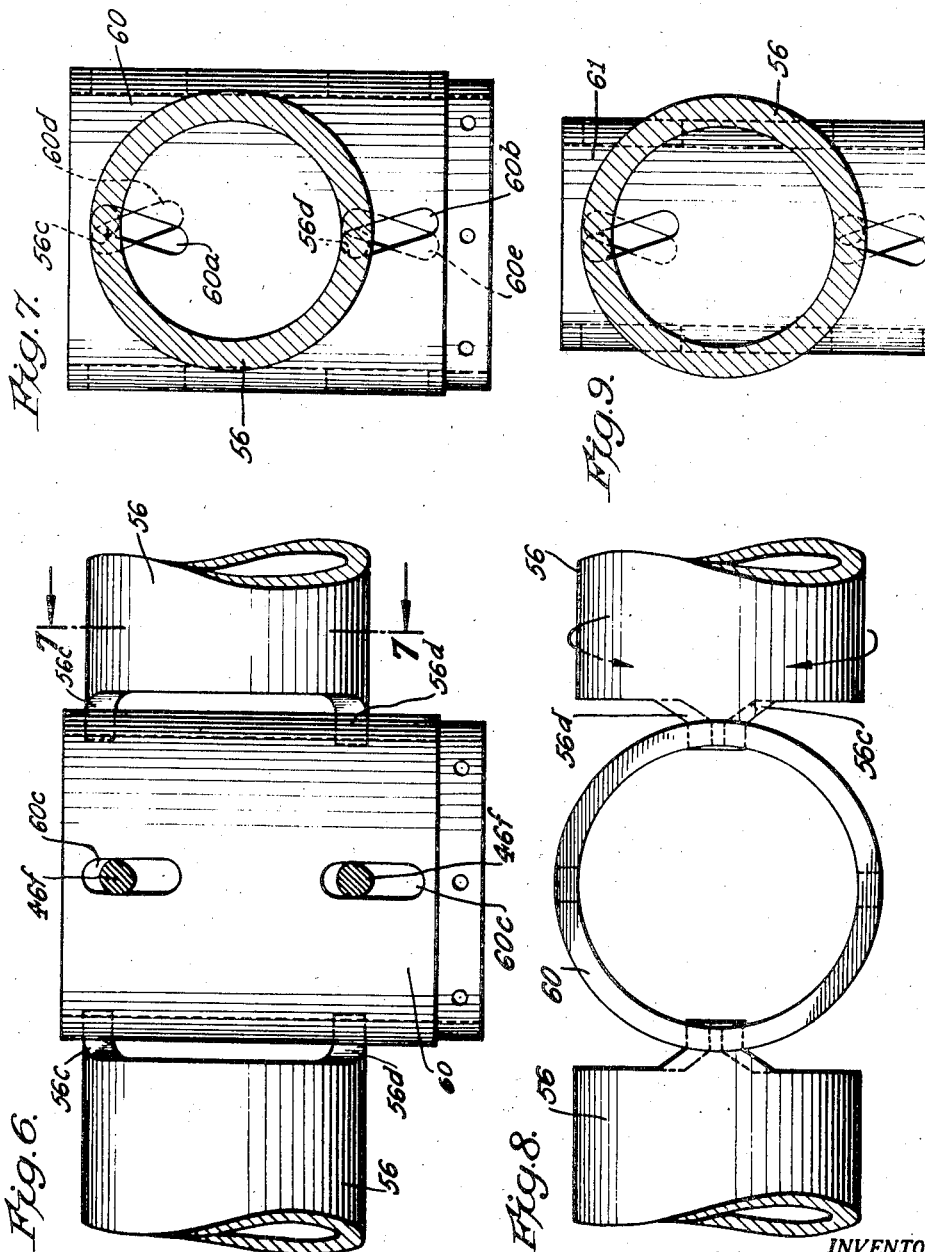

Dec. 14, 1948.      V. BENDIX      2,456,485
HELICOPTER WITH COAXIAL ROTORS
Filed Nov. 23, 1943      15 Sheets-Sheet 8
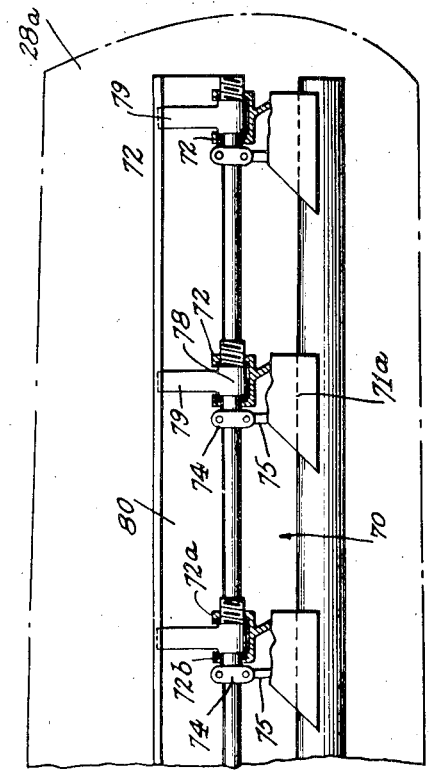
Fig. 10.
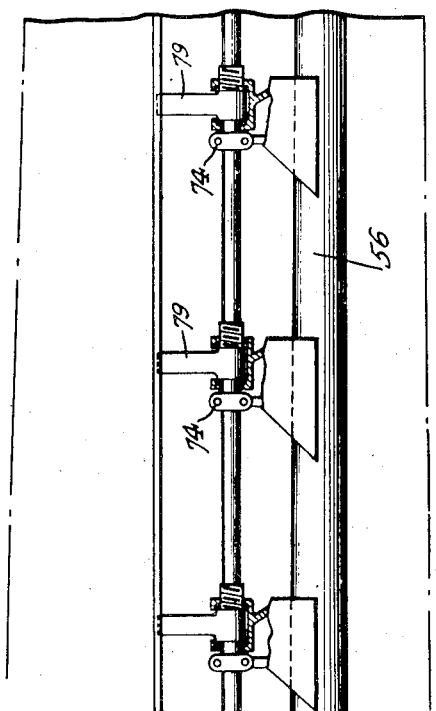
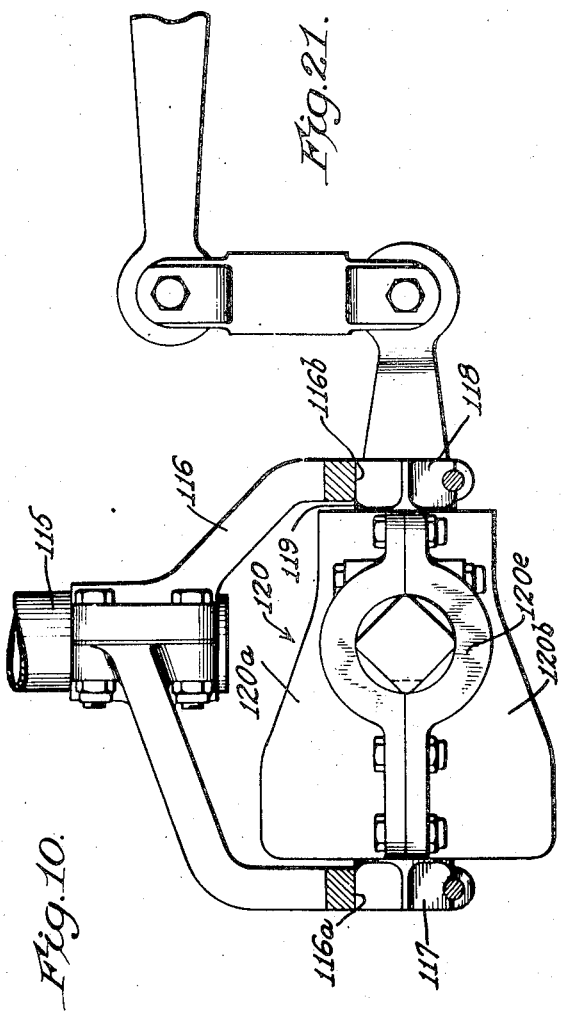
Fig. 21.
INVENTOR.
VINCENT BENDIX
BY
his ATTORNEYS Dec. 14, 1948.                V. BENDIX                 2,456,485
                    HELICOPTER WITH COAXIAL ROTORS
Filed Nov. 23, 1943                              15 Sheets-Sheet 10
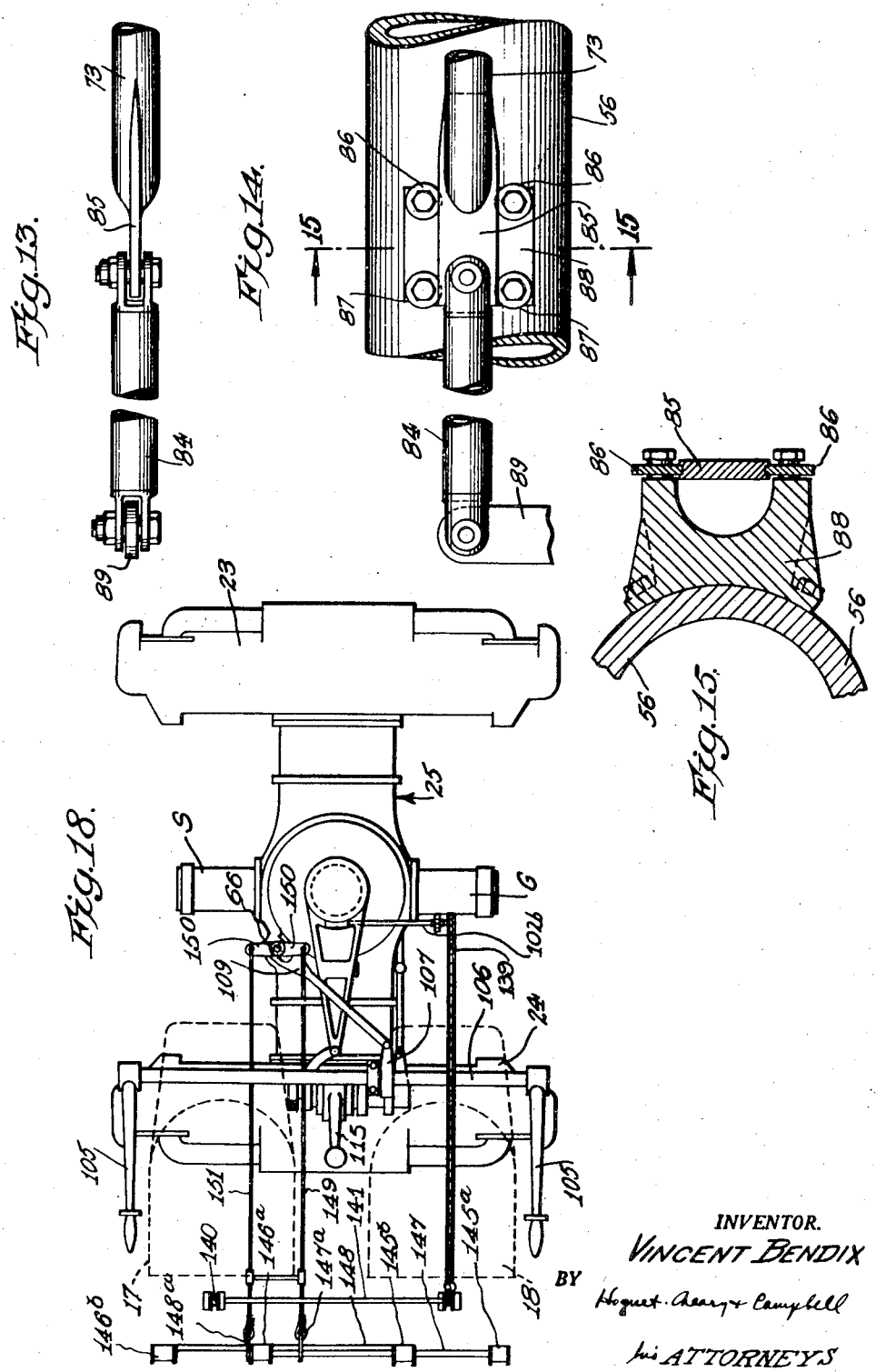
INVENTOR.
VINCENT BENDIX
BY
his ATTORNEYS Dec. 14, 1948.  V. BENDIX  2,456,485
HELICOPTER WITH COAXIAL ROTORS
Filed Nov. 23, 1943  15 Sheets-Sheet 11
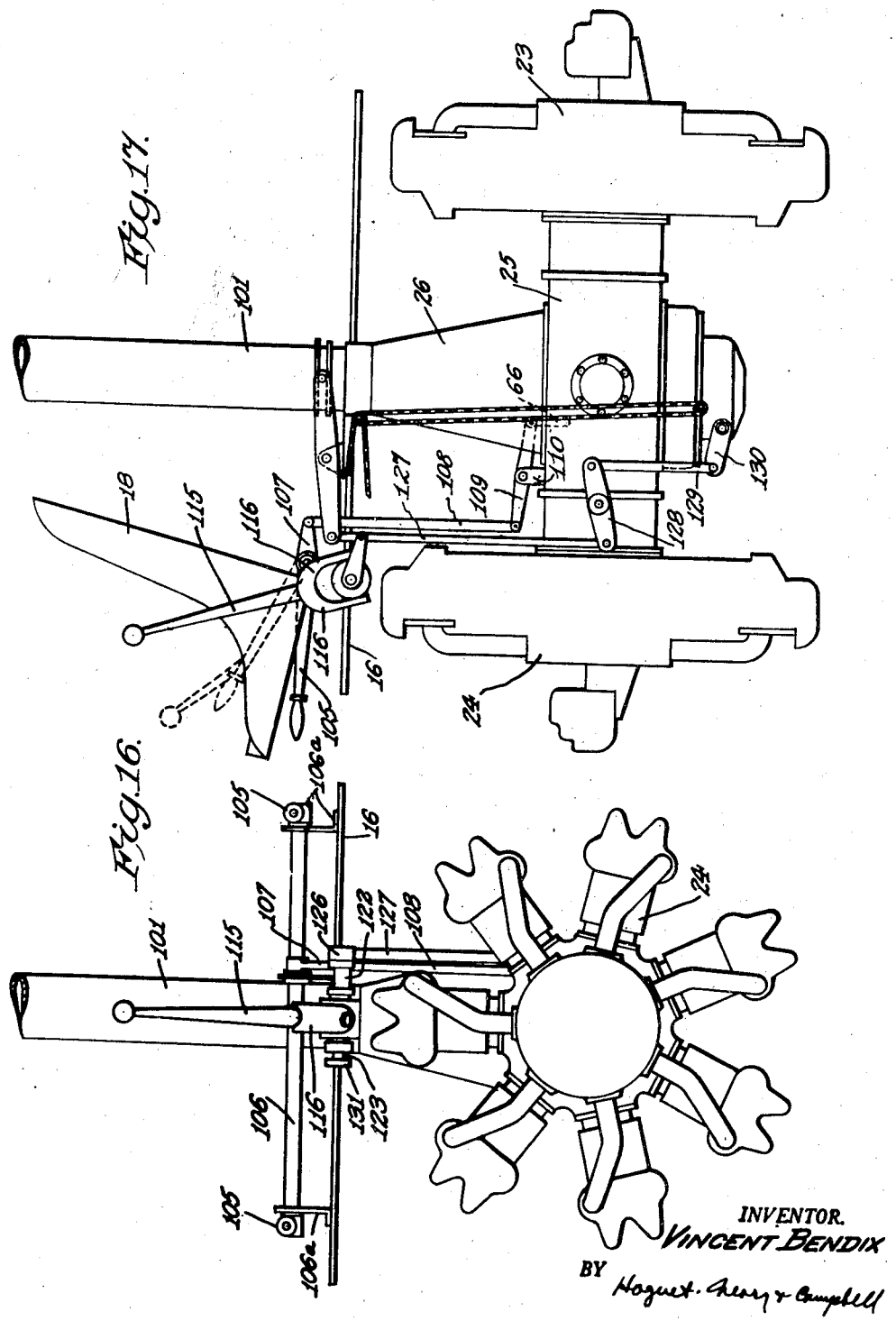
INVENTOR.
VINCENT BENDIX
BY Hoguet, Neary & Campbell
his ATTORNEYS Dec. 14, 1948.  V. BENDIX  2,456,485
HELICOPTER WITH COAXIAL ROTORS
Filed Nov. 23, 1943  15 Sheets-Sheet 12
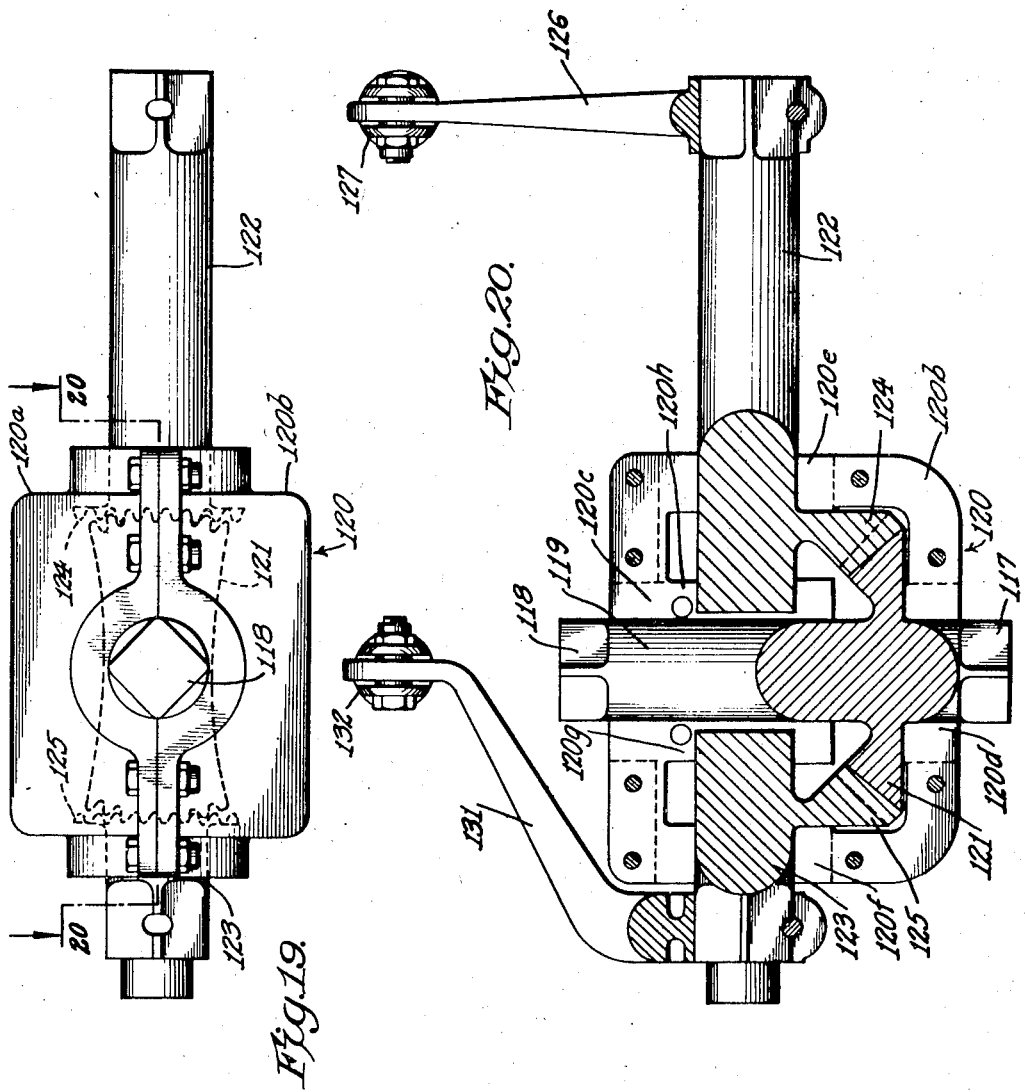
INVENTOR.
VINCENT BENDIX
BY
his ATTORNEYS

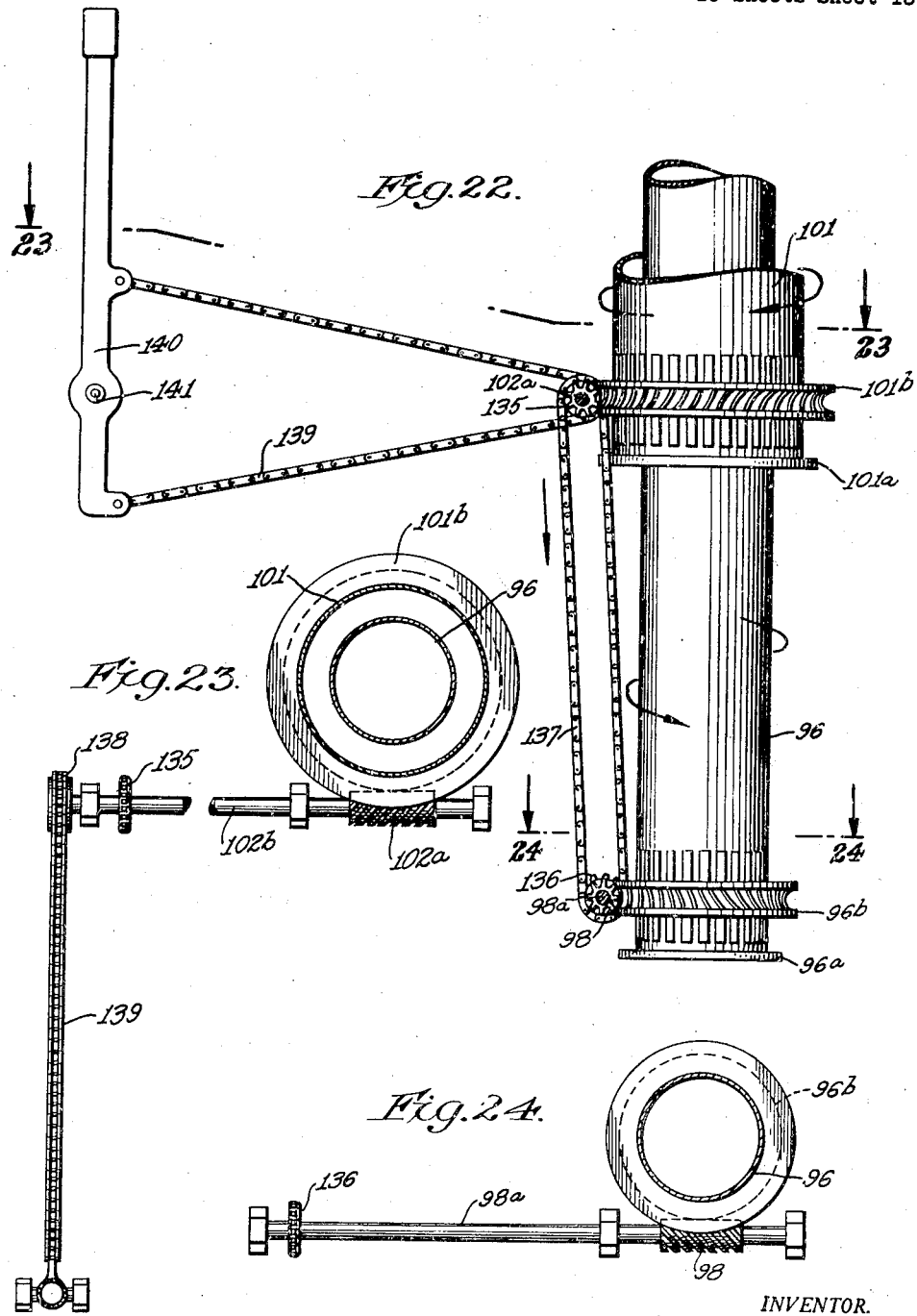

Dec. 14, 1948.  V. BENDIX  2,456,485
HELICOPTER WITH COAXIAL ROTORS
Filed Nov. 23, 1943  15 Sheets-Sheet 14

INVENTOR.
VINCENT BENDIX
BY
his ATTORNEYS

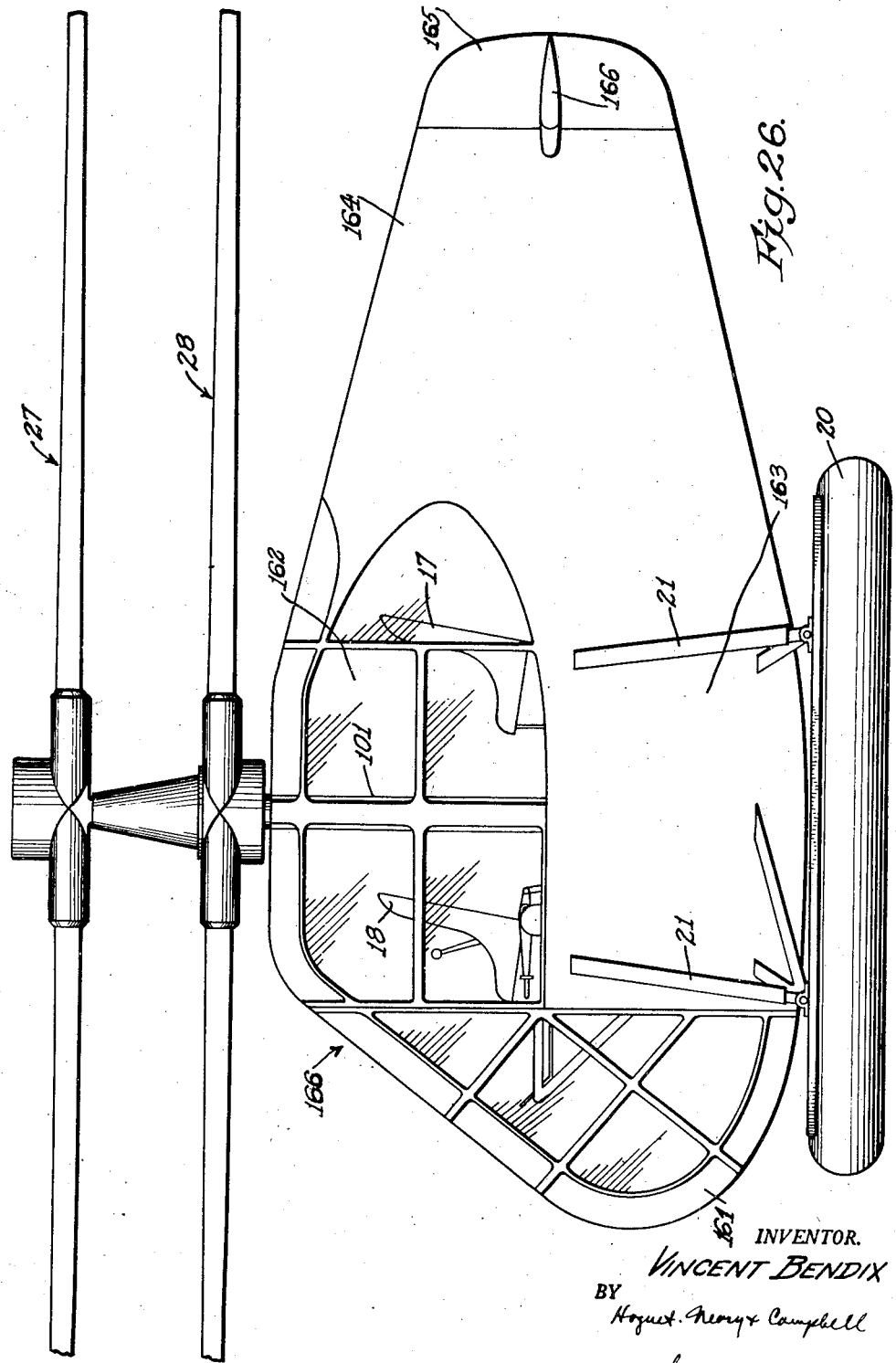

Patented Dec. 14, 1948

2,456,485

UNITED STATES PATENT OFFICE 2,456,485

HELICOPTER WITH COAXIAL ROTORS

Vincent Bendix, Flemington, N. J., assignor to Helicopters, Inc., a corporation of Delaware Application November 23, 1943, Serial No. 511,408

19 Claims. (Cl. 170—135.24)

1

This invention relates to aircraft and relates particularly to improvements in rotary wing aircraft of the helicopter type.

Many different types of helicopters have been designed in the past and a few of these designs have been embodied in full size helicopters and have been tested and successfully flown. Generally, these prior helicopters may be divided into three classes: first, the single rotor type, second, the counterrotating, coaxial rotor type, and, third, the multiple horizontally spaced rotor type.

Apparently the most successful type of helicopter developed heretofore, is the single rotor helicopter which uses a multiple-wing rotor for lifting and propulsion and a second torque-opposing propeller mounted on a tail boom on the end of the fuselage.

While this type of helicopter has been flown successfully, it has several inherent disadvantages. In forward flight, the advancing wing has greater lift than the wing retreating from the airstream, and in order to equalize the lift and eliminate the tendency for the craft to roll over on one side, it is necessary to provide an articulation or hinge at the root of each wing of the rotor. This articulation of the wing permits the advancing wing to rise, effecting a virtual decrease in its pitch and permitting the retreating wing to descend, thus effecting a virtual increase in its pitch. This alternating rising and falling of the wing, a phenomenon known as flapping, eliminates the rolling tendency previously mentioned. The faster this type of helicopter flies, however, the greater is the amount of flapping required, until at even moderately high speeds the flapping becomes so violent that the action of the rotor is rough and sets up violent vibrations. Thus a very definite limit is set to the speed which this type of aircraft can maintain safely in forward flight. Moreover, the flapping of the wings frequently is in synchronism with the natural vibration periods of the landing gears and causes a particularly dangerous effect known in the art as round resonance.

Single rotor helicopters must include, also, a torque-neutralizing propeller for resisting the tendency of the body of the helicopter to rotate about the axes of the rotor. The inclusion of such a torque-resisting or neutralizing propeller is disadvantageous inasmuch as it dissipates power without contributing either to lift or to propulsion, and contributes to drag as it meets the air sidewise.

Some of these difficulties disappear in the counter-rotating, coaxial rotor type of helicopter, inasmuch as counter-rotation of the rotors overcomes the tendency of the cabin or fuselage to rotate because of torque reaction and thus eliminates the loss of power dissipated by the torque-resisting propeller. There remain, however, difficulties which are inherent to both types of aircraft, some of the most important of which are encountered in securing propulsion or motion in any desired direction. Sometimes propulsion has been achieved by tilting the axis of the entire rotor assembly. However, the tilting of the axis of the main motor is not a satisfactory solution to the problem of propulsion for the reason that power must be transmitted through the shaft that is to be tilted, the control forces are very large, and the control stick or other control mechanism tends to be violently displaced by the aerodynamic forces involved. If the tilting of the plane of rotation is to be made to disappear, a great deal of skill and judgment are required of the pilot. Even then, inasmuch as the whole aircraft with its considerable moment of inertia has to be tilted in space, considerable time and effort are required in achieving propulsion and in maintaining level flight.

Another method of securing propulsion applied in both the single rotor helicopter and in the coaxial counter-rotating helicopter, has been to utilize cyclical feathering control, by periodically varying the pitch angle at certain phases or portions of the rotational cycle. While the cyclical feathering control appears to be correct in principle, it requires a complicated mechanism, and its action in securing propulsion is indirect. The cyclical control tilts the virtual plane of rotation, and hence the virtual line of thrust. The titling of the thrust line in turn pitches the fuselage so that it is only after some time that equilibrium in translational motion is obtained. This difficulty in establishing equilibrium in translational motion is one of the reasons why the control of the helicopter as it has been constructed to date has required so much skill by the pilot.

In helicopters of all types constructed to date translational motion (whether achieved by inclination of the rotor or by cyclical feathering) has entailed inclination of the fuselage in the direction of motion. Such inclination of the fuselage has resulted in increased drag or air resistance, and also has an unpleasant effect on the occupants.

When flapping wings are used in coaxial helicopters, mutually induced vibrations appear, and unless the rotors are spaced sufficiently far apart to render the assembly unwieldy the tips of the upper and lower rotors come dangerously close together.

Similar difficulties and complexities have appeared in the counter-rotating rotors of the horizontally spaced type, as in the helicopter in which rotors have been disposed on either side of the fuselage.

The above-mentioned factors and others have retarded the development of safe and easily controlled helicopters.

An object of the present invention is to provide a helicopter of the coaxial, counter-rotating rotor type having all of the advantages inherent in such coaxial types of helicopter, and eliminating the difficulties or disadvantages which have hitherto been inherent in such coaxial types.

Another object of the invention is to provide a helicopter of the coaxial, counter-rotating rotor type in which precise adjustment can be obtained to counteract torque developed by the rotors and the source of power.

A further object of the invention is to provide a simple, efficient and sturdy mechanism for transmitting power from the power source to the rotors, in which power losses due to friction and bending of the mechanism are largely eliminated.

A still further object of the invention is to provide a power and transmission mechanism of unitary nature in which all of the controls for the rotors are centralized.

An additional object of the invention is to provide a power and transmission unit for a helicopter including a plurality of engines that are capable, individually or collectively, of operating the rotors or allowing the rotors to rotate freely, thereby increasing the safety of the device.

A still further object of the invention is to provide propulsion means in the rotors by means of which higher flying speeds and more efficient use of power for propulsion are obtained.

Another object of the invention is to provide propulsion means which permit a wide variation of speeds and/or motions in various directions to be obtained.

A further object of the invention is to provide propulsion means which may be utilized to equalize the lift of the wings while the helicopter is in flight and stabilize or correct for tilting and pitching in flight.

Other objects of the invention will become apparent from the following description of typical forms of helicopters embodying the present invention.

In accordance with the present invention, I have provided a helicopter in which the lifting action is obtained by means of a pair of coaxial, counter-rotating, variable pitch, rotors. The rotors of the device include at least two wings, preferably of air-foil cross-section, which can be varied in pitch in order to regulate the amount of lift or to permit the rotors to turn freely during descent in the direction normally driven by the motors.

In order to propel the helicopter in a desired direction, each wing of the rotor is provided with a propeller or control blade, in the nature of a flap, which is movable between a position within the section of the wing, i. e., forming a part of the wing contour, to a position projecting beyond the section of the wing. These propeller blades act upon the atmosphere during rotation and produce a reaction tending to force the helicopter in a direction opposite to the direction of movement of the blade when projected. In operation, the blades on the wings may be moved into projected position at will to obtain a rowing and/or stabilizing action which causes the helicopter to move in the direction desired and maintains it level in flight.

The helicopter is provided with mechanism for varying the amount of projection of the propeller blades and the position of the arc traversed while the propeller is projected, thereby permitting a close control over the planes of rotation of the rotors and allowing close and accurate balancing of the torque impulses of the rotors.

The propeller or control blades have the additional function of varying the sectional shape of the wings, and thereby varying the amount of lift obtained by means of the wings. Inasmuch as the propeller blades may be projected during movement of the wings in a direction opposite to the direction of flight, the propeller blades may be used to provide increased lift, thereby offsetting the decreased lift caused by motion of the helicopter. Moreover, these elements may be utilized to stabilize the helicopter and to correct for unwanted tilting or pitching.

Devices embodying the present invention are further characterized by the inclusion of all of the operating elements and the major portion of the controls for the device in a unitary construction. Thus, the rotors are mounted on counter-rotating concentric tubular shafts which are supported on and driven by means of a transmission that is connected to and operated by one or more engines. Overrunning clutches are interposed between the engines and the transmission in order to permit one or more of the engines to drive the shafts or permit the shafts to rotate relatively to the engines if one or more of the engines should be disabled.

The control elements for varying the pitch of the wings of the rotors and for controlling the extension and retraction of the propeller blades in the wings are mounted concentrically with or are coaxial with the tubular drive shafts, thereby providing a compact mechanism in which all of the various elements act to reinforce and stiffen the other elements to provide a strong rigid assembly of reasonable weight.

As will further appear from the following, more detailed description of my invention, the body of the helicopter can always maintain a horizontal position no matter in which direction the craft is propelled, thus adding to the comfort of the passengers and also eliminating the increase in drag which is produced by the inclination of the body.

Inasmuch as propulsion is merely a matter of projecting blades on the retreating wings of the upper and lower rotors and only relatively small blades have to be moved, the effort required is small in order to establish propulsion in a desired direction. Moreover, movement can be obtained in a minimum amount of time and no special skill is required, since the helicopter does not tilt as a whole. By utilizing propeller blades and the associated means for displacing them at appropriate points in the rotational cycle, and in appropriate combination or association with one another, universal control of the movements and stability of the helicopter can be attained in a manner hitherto unavailable in either the airplane or the helicopter. Thus appropriate manipulation of these blades secures propulsion and motion in any direction, along any of the three axes of the aircraft. Again by appropriate coordination of the operation of the blades, a combination of turning and rolling can be obtained to give a perfect turn without skidding or slipping. Moreover, the pilot can produce a flat turn without any inclination of the aircraft whatsoever. There can be attained also a true pitching motion about the transverse axis, without either rolling or turning, or a true rolling motion without pitching or turning, or any desired combination of pitching and rolling, or pitching and turning. Helicopters embodying the present invention, it will be seen, have true universality of control combined with complete maneuverability, two results that are most important for the safety and effectiveness of the helicopter and are particularly valuable in the case of the military or naval helicopter.

In the present helicopter, equalization of lift and control is achieved by other means than feathering or flapping and the wings of the rotors are in normal operation given but a single direction of freedom, namely rotation about the vertical axis of the helicopter. Because of this single direction of freedom in normal operation, the rotor system can be made very strong and rigid and free from vibration so that the forward speed of the helicopter is limited only by considerations of engine power and the power required to rotate the wings and blades. Again, because of the greater rigidity of the rotors, all such effects as ground resonance are eliminated.

There are other advantages of helicopters embodying the present invention which have an important bearing on their usefulness and effectiveness. Thus, the propulsive effort of such helicopters can be reversed very rapidly, inasmuch as a corresponding change in the inclination of the helicopter first in one direction and then in the other is not required. Such rapid reversal of the propulsive effort is a safety measure for civil flying, and a definite addition to military maneuverability.

For a better understanding of the present invention, reference may be had to the accompanying drawings, in which:

Figure 1 is a view in front elevation of a typical form of rotary wing aircraft embodying the present invention;

Figure 2 is a top plan view of the aircraft;

Figures 4a and 4b are views in vertical section and partly broken away of the power unit, transmission and certain of the operating controls for the device mounted in a modified form of frame;

Figures 5a and 5b are views in vertical section and partly broken away showing the transmission and controls for the wings and propeller blades on somewhat larger scale than in Figures 4a and 4b;

Figure 6 is a view in side elevation of a portion of the mechanism for varying the pitch of one of the wings;

Figure 7 is a view on line 7—7 of Figure 6;

Figure 8 is a top plan view of the device of Figures 6 and 7;

Figure 9 is a view in side elevation showing the pitch-varying mechanism for the other wing;

Figure 10 is a top plan view illustrating a portion of a rotor wing, showing the mounting for the propeller blade;

Figure 13 is a top plan view, partly broken away, of a portion of the operating mechanism for the propeller blade;

Figure 14 is a view in side elevation illustrating a mounting for a portion of the operating mechanism for the propeller blade;

Figure 15 is a view in cross-section on line 15—15 of Figure 14;

Figure 16 is a view in front elevation illustrating an engine and the control levers for controlling the helicopter;

Figure 17 is a side view illustrating the relationship between the control levers and the motor and transmission unit;

Figure 18 is a top plan view of the motor and transmission illustrating the connections between the control levers and the operating mechanism for varying the positions of the propeller blades, and varying the pitch of the wings;

Figure 19 is a view in front elevation of the gear box of one of the control levers;

Figure 20 is a view in cross-section taken on line 20—20 of Figure 19;

Figure 21 is a view in side elevation of the control lever gear box illustrating the control lever partly broken away;

Figure 22 is a view in elevation of a portion of the mechanism for attaining longitudinal pitch control.

Figure 23 is a view in section taken on line 23—23 of Figure 22.

Figure 24 is a view in section taken on line 24—24 of Figure 22.

Figure 26 is a view in side elevation of a modified form of helicopter embodying the present invention.

Figure 3:
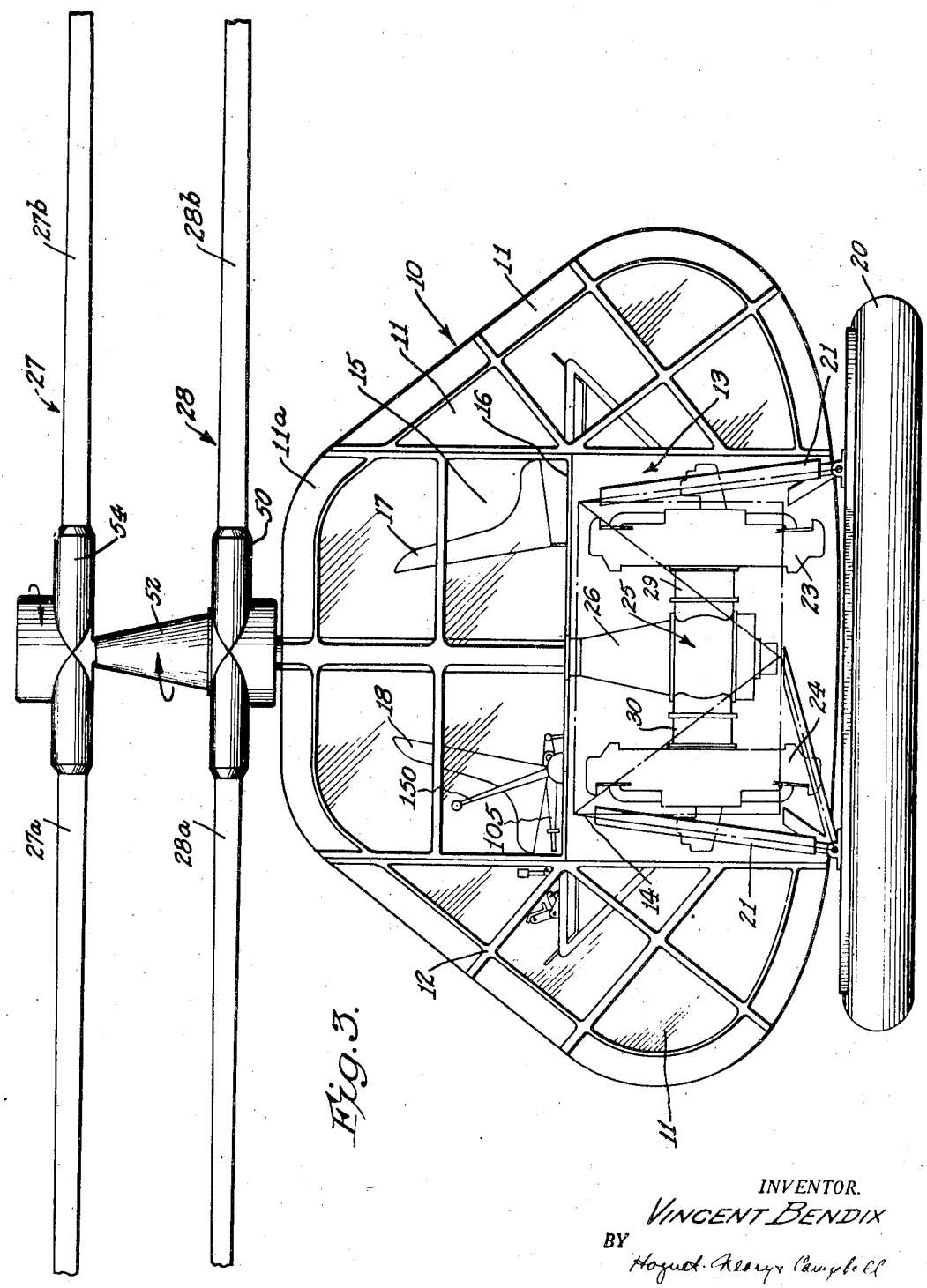
Figure 3 is a view of the device in side elevation, and partly broken away.

The form of helicopter illustrated in Figures 1, 2 and 3 may consist of a fuselage, nacelle, or body 10 of generally oval shape in front elevation and in plan which consists largely of transparent panels 11 of appropriate contour mounted in the frames 12. As shown particularly in Figure 3, the body 10 has a lower engine compartment 13 containing a framework 14 formed of steel tubing or the like, shown in dotted lines, of generally bridgework or triangulated structure. Above the compartment 13 is a passenger compartment 15 having a floor 16 upon which are mounted pairs of oppositely facing seats 17 and 18. The body 10 is generally symmetrical, affording visibility in substantially all directions, thereby making the cabin particularly suitable for observation purposes.

The helicopter may be provided with landing gear of any desired type. As illustrated in Figures 1, 2 and 3, the helicopter may be provided with inflated pontoons 20 supported on outriggers 21, on opposite sides of the body 10 which are joined to the tubular frame 14 of the device.

Figure 4A:
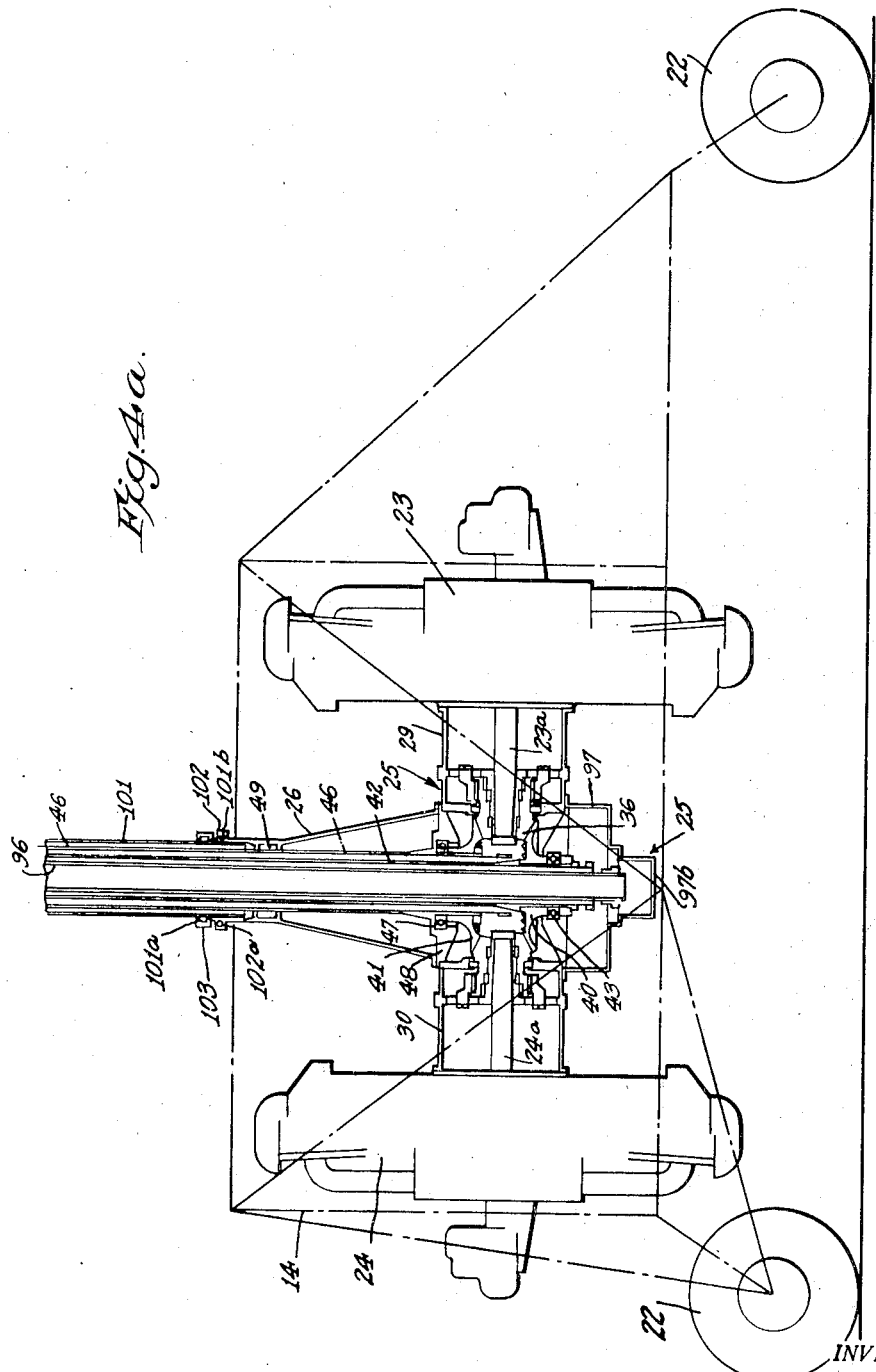

As illustrated in Figure 4a, landing gear wheels 22 may be substituted for the pontoons 20, if desired. The landing gear is conventional and forms no part of the present invention.

As shown in Figures 3 and 4a, a pair of radial engines 23 and 24 are supported in the frame 14 and have their respective crankshafts 23a and 24a projecting inwardly in axial alignment into a banjo type transmission gear box 25. The gear box 25 is provided with an upwardly projecting casing portion 26 which acts to support and journal a number of concentric shafts including the shafts upon which the two rotors 27 and 28 are mounted.

As best shown in Figure 5a, the gear box 25 is interposed between a tubular flanged member 29 which is bolted or otherwise secured to the motor 23 and a second similar cylindrical flanged member 30 which is secured to the motor 24. At the inner end of the member 29 is secured a ring gear 31 having a rim portion interposed between the member 29 and a cup-shaped casing 32 that forms a housing for a reduction gear and forms one end of the gear box 25. The reduction gear includes the ring gear 31, a plurality of planet gears 33 rotatably mounted upon a sleeve 34 and a sun gear 35 which includes a sleeve 35a fixed to the drive shaft 23a for rotation therewith.

The sleeve 34 is concentric with the hub 36a of a bevel pinion 36 which is rotatably mounted on the sun gear sleeve 35a by means of suitable needle or roller bearings 37. The hub 36a forms with the sleeve 34 and suitable rollers 38 an overrunning clutch permitting the pinion 36 to overrun the sleeve 35a. The pinion 36 is mounted in an anti-friction bearing 39 in the flange 32a of the cup-shaped casing 32. With the construction described thus far, rotation of the shaft 23a causes the planet gears to roll upon the internal gear 31, effecting a reduction in speed of rotation of the sleeve 34 and the pinion 36.

The pinion 36 meshes with a pair of bevel gears 40 and 41 to cause them to rotate in opposite directions. The bevel gear 40 is secured to a tubular drive shaft 42 which is mounted in an anti-friction bearing 43 in a detachable bottom section 44 of the casing 25. The upper bevel gear 41 is fixed to a tubular drive shaft 46 which is rotatably mounted in anti-friction bearing 47 in a detachable section 48 at the upper end of the transmission casing 25. Thus, upon operation of the drive shaft 23a, the bevel gears 40 and 41 and the drive shaft 42 and 46 are rotated in opposite directions and at reduced speed.

The drive shaft 24a is connected to the ring gears 40 and 41 in exactly the same way as the shaft 23a so that when both of the motors 23 and 24 are operating, their effects are exerted in the same direction to rotate the shafts 42 and 46. When one of the motors, for example, motor 23, is not operating or is disabled, the overrunning clutch formed by the sleeves 34 and 36a and the rollers 38 permits the motor 24 alone to drive the rotors in the same direction. If both of the motors 23 and 24 should become inoperative, the shafts 42 and 46 can overrun and permit the rotors 28 and 27, respectively, affixed thereto to windmill and thus bring the helicopter to a safe landing. The free running characteristics of the transmission make it possible to mount a starter S (Figure 18) on the gear box 25 and to connect the starter to the gears 40, 41 by means of an overrunning clutch and gear (not shown) or a conventional starter clutch, thereby permitting the initiation of rotation of the rotors 27 and 28 before the engines 23 and 24 are started.

The generator G for the engines 23 and 24 can also be geared to the transmission and mounted on the gear box 25.

While overrunning clutches have been described, it will be understood that friction or jaw clutches may be substituted for the overrunning clutches or may be inserted between the motors 23 and 24 and the overrunning clutches. The friction or jaw clutches have the advantage of permitting the engines to be operated without rotating the rotors 27 and 28. When a clutch in the nature of a friction clutch is provided, it may be manipulated to start the rotors and the starter S may be omitted. Each engine may be equipped with a starter.

As shown in Figure 5b, the upper end of the tubular drive shaft 46 is provided with a retaining flange portion 46a and a bearing retainer 46b secured thereto which receives an anti-friction bearing 46c engaging the shaft 42 so that these shafts are maintained in concentric relationship and are stiffened and strengthened by each other. The shaft 46 is further strengthened and rigidified by means of the member 26 (Figure 4a) which is provided at its upper end with anti-friction bearings 49 rotatably engaging the shaft 46.

Below the flange 46a is mounted the hub 50 of the lower rotor 28. As best shown in Figures 1 and 2, the hub member 50 is of generally aerodynamic or oval cross-section to reduce its wind resistance and is a parallelogram in plan. As shown in Figures 4b and 5b, the hub is of tubular or hollow construction and is provided with an internally threaded aperture 51 at its upper end which engages the threaded upper end of the shaft 46. The hub 50 may be locked to the shaft 46 by means of a suitable key. The flange 46a is bolted or otherwise secured to the hub 50. The rotor hub 50 is provided with a generally conical casing member 52 secured to its upper surface which has an anti-friction bearing 53 in its upper end, bearing against and supporting the shaft 42.

The upper rotor 27 is provided with a hub 54 similar to the hub 50 of the rotor 28, but having its end edges inclined oppositely to the end edges of the rotor hub 50 as shown particularly in Figure 2 of the drawings. The hub 54 is threaded on the upper end of the shaft 42 and is retained in fixed relationship to the shaft 42 by means of a key and the sleeve 55 which is secured to the hub 54.

The above-described assembly forms a very rigid and strong support for the wings and allows the rotor to be lightened considerably without loss of strength.

Figure 12:
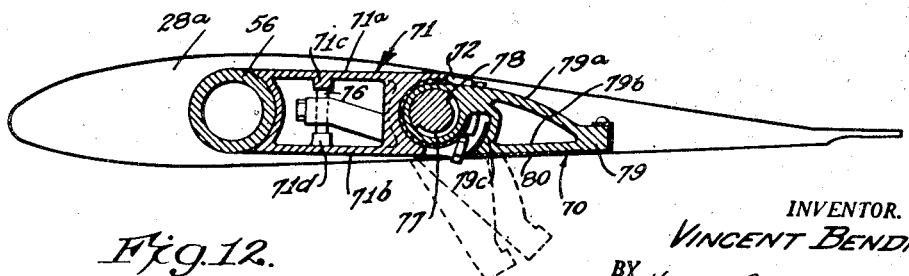
Figure 12 is a view in section taken on line 12—12 of Figure 11.

Each of the rotors 27 and 28, as illustrated, includes two wings, although more than two can be provided if desired. The rotor 28 includes the hub 50 and the two wings 28a and 28b which are of aero-dynamic cross-section, as best shown in Figure 12 of the drawings. That is, the wings 28a and 28b are generally in the shape of an airplane wing or air-foil. Inasmuch as the wings 28a and 28b, as well as the wings 27a and 27b, are similar, only one of these wings will be described.

As shown in Figures 5b, 10, 11 and 12, the wing 28a is provided with a tubular spar 56 which extends substantially the length of the wing and is offset forwardly of the center line of the wing. The spar 56 extends radially from the axis of the shaft 42 and 46 and for that reason, the entire wing is offset slightly with respect to the axis of the shafts 42 and 46, as shown in Figure 2. The spar 56 is preferably formed of steel or other strong material and is provided with a shank portion 56a that is received in a roller or needle bearing sleeve 57 of circular cross-section that is threaded in the outer end of the hub 50. An anti-friction thrust bearing 58 is disposed between the inner end of the sleeve 57 and a shoulder 56b on the spar and prevents the spar from moving outwardly under centrifugal force. The inner end of the spar 56 is received in a cylindrical socket member 50a with needle bearings 59 interposed therebetween to permit ready rotation of the spar 56.

Each of the wings 28a, 28b, 27a, 27b, is similarly mounted in the hubs 50 and 54 with the leading edges of the wings facing in directions corresponding to the direction of rotation of the rotors.

In order to vary the pitch of the wings to regulate the lifting characteristics of the device, each of the spars 56, for example, that of the wing 28a, is provided with a pair of lugs 56c and 56d projecting inwardly from its inner end, as shown in Figures 6, 7 and 8. The lugs 56c and 56d pass through slots 46e and 46d (Figure 5b) in the shaft 46, these slots being arcuate about the axis of the spar, and are received in cam slots 60a and 60b of a sleeve 60, these slots being oppositely inclined and symmetrical with respect to a common vertical line. The sleeve 60 is provided with axially extending slots 60c for receiving pins 46f (Figure 6) projecting inwardly from the drive shaft 46 so that the sleeve 60 rotates with the drive shaft 46. Inasmuch as the slots 60c are elongated, the sleeve 60 can move axially of the drive shaft 46 and in so doing causes the spar 56 to rotate about its longitudinal axis, thereby varying the pitch of the wing 28a.

The wing 28b is similarly connected to the sleeve 60. The slots 60d and 60e for receiving the spar lugs 56c and 56d are inclined in a direction to cause the wings 28a and 28b to rock in the opposite direction to alter their pitch simultaneously and in the same sense.

The wings 27a and 27b may be adjusted by means of a sleeve 61 (Figures 5b and 9) similar to the sleeve 60, but of smaller diameter so that it can be slidably received within and splined to the drive shaft 42 in the same manner as sleeve 60.

The sleeve 60 is secured to a tubular shaft 62 which, as shown in Figure 5a, terminates between the ends of the drive shafts 23a and 24a.

The pitch varying sleeve 61 is secured to a tubular shaft 63 which terminates beneath the cap member 44 of the transmission. These shafts 62 and 63 have fixed on their lower extremities ring members 62a and 63a which are rotatably received within annular channels of rings 64 and 65, respectively. The rings 64 and 65, as shown in Figure 5a, are connected by a shaft 66 having oppositely threaded portions for receiving nuts that engage the levers 64a and 65a (Fig. 25) that are pivotally connected to the rings 64 and 65 so that upon rotation of the shaft the levers 64 and 65a are rocked in opposite directions. Endwise movement of the shaft 66 moves the shafts 62 and 63 in unison.

The shafts 62 and 63 may be shifted to vary the pitch of the wings in a manner and by a mechanism to be described hereinafter.

The above-described mechanism constitutes the means for providing lift in a vertical direction and for directional control.

In order to propel the helicopter, propulsion means are provided which form a portion of the rotor structure.

As shown in Figures 1 and 2, each of the wings 27a, 27b, 28a, and 28b is provided with one or more flaps 70, hereinafter referred to as a propeller or control blade 70. The propeller or control blade 70 on each wing is movable between a position within the section of the wing to a position projecting from the wing, as best shown in Figure 12. The propeller blades 70 act as the propulsion means for the device by rowing or reacting against the air during the rotation of the rotors to force or move the helicopter generally in a direction opposite to the direction of thrust of the propeller blade. Thus, for forward flight, the propeller or control blade 70 on the wing 27b will be projected as this blade moves clockwise from front to rear of the cabin 10, as viewed in Figure 2, while the propeller or control blade 70 on the wing 28a will be projected as the rotor 28 rotates in a counterclockwise direction from front to rear of the cabin 10. As rotation continues the propeller blade 70 on the wing 27a will be projected as that wing traverses a clockwise arc from front to rear of the body 10, while the propeller blade 70 on the wing 28b will be projected as the wing 28b traverses a counterclockwise arc from front to rear of the body 16.

The propeller blades 70 also are used to equalize the lifting effect of the wings. It will be apparent that while the helicopter is moving through the air, the wings moving in the direction of flight will exert a greater lift than the wings that are moving oppositely to the direction of flight. When the propeller blades 70 are projected from the wings, they act like flaps to increase the lift of the wings. Thus, the projection of the propeller blade during rearward movement of a wing will increase the lift of the wing and offset, to a large extent, the loss of lift due to the motion of the helicopter. Inasmuch as the lift exerted by the wings is substantially equalized, less flexing of the wings occurs and vibration is correspondingly reduced.

Figure 11:
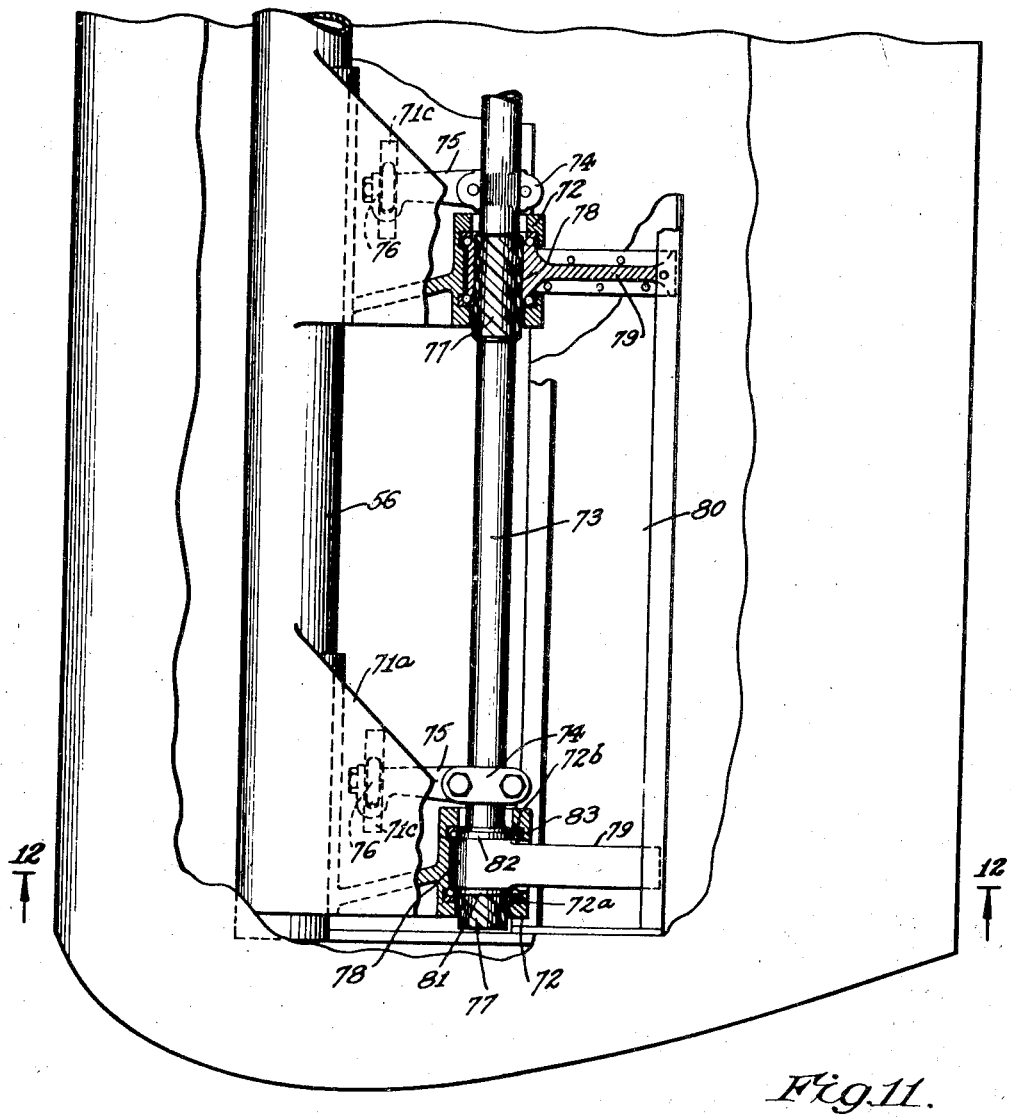
Figure 11 is an enlarged showing of a portion of the wing of Figure 10, partly broken away to illustrate details of the propeller blade mounting.

One type of mounting for the propeller blades 70 is illustrated in greater detail in Figures 10, 11 and 12 of the drawings. Projecting rearwardly from the spar 56 are a plurality of box-like members 71 consisting of top and bottom plates 71a and 71b of generally triangular shape which are secured in spaced parallel relationship to the rear portion of the spar 56 in any suitable way, such as, for example, by welding. As best shown in Figure 11, at the righthand end of the box-like member is a journal 72 comprising spaced apart annular portions 72a and 72b in which is received a shaft 73 extending parallel with the spar 56. The shaft 73 is provided with a series of brackets 74 having forwardly projecting arms 75 thereon, each arm carrying a roller 76. The roller 76 is disposed between tracks 71c and 71d on the plates 71a and 71b, respectively. The brackets 74 are connected non-rotatably to the shaft 73 so that the shaft is capable of endwise movement, but cannot rotate. The shaft 73 is provided with a plurality of screw or helical gears 77 corresponding to the number of journals mounted on the spar 56. The gears 77 are received in internally threaded hubs 78 on rearwardly projecting arms 79 which form the ribs for the propeller blades 70. The ribs 79 are of skeleton formation, preferably having an upper curved surface 79a, a flat lower surface portion 79b and a forwardly curved portion 79c over which is secured a skin 80 forming a cover for the propeller blade 70. The skin preferably is formed of sheet metal in order to impart strength to the asembly. The exterior of the hub portion 78 of the ribs 79 is provided with ball races 81 and 82 which engage anti-friction journal and thrust bearings 83 mounted in the journal 72, thereby permitting easy pivoting of the propeller blade 70 within the journal while maintaining it against axial displacement.

The above-described construction provides a mechanism whereby the propeller blade 70 may be projected from and retracted within the section of the wing of the rotor 27 or 28. Endwise movement of the shaft 73 toward the hub of the rotor 27 or 28, as viewed in Figure 11, will cause the propeller blade 70 to rock downwardly to any desired position such as shown in Figure 12, depending upon the distance that the shaft 73 is moved. Outward movement of the shaft 73, as viewed in Figure 11, will cause the propeller blade 70 to be retracted within the periphery of the wing. The above-described movements of the shaft 73 render the retraction of the propeller blades 70 partially responsive to centrifugal force so that more rapid action is obtained at higher rotor speeds. The shaft 73 is normally urged outwardly by centrifugal force, thereby tending to rock the propeller blades 70 into retracted position.

The mechanism for moving the shaft 73 is disclosed more particularly in Figures 4a, 4b, 5a, 5b, 13, 14 and 15. As shown in Figure 4b, the shaft 73 extends inwardly to adjacent the end of the hub 50 or 54. The inner end of the shaft 73 is provided with a flattened portion 85 (Figures 4b, 13, 14 and 15) which is received between two pairs of rollers, 86, 86 and 87, 87 mounted on a bracket 88 secured to the back of the spar 56. The rollers guide the endwise travel of the shaft 73 and tend to prevent wobbling or buckling of the shaft. To allow for the pitch change of the wing, the link 84 is loosely pivotally connected at one end to portion 85 and loosely pivotally connected at the other end to a lever 89 mounted pivotally on the hub 50 and 54. A parallel shorter link 90 is also pivotally mounted on the hub 50 or 54. The lever 89 and link 90 are pivotally connected to a bracket 91 having a bifurcated portion 91a within which is received a cam follower roller 92. The link construction will cause the axis of the roller 92 to remain substantially parallel with the axis of the drive shafts 42 and 46. The cam roller 92 connected with each of the shafts 73 of the wings 27a and 27b, for example, cooperates with a cam member 93 which is slidably axially of and rotatable relatively to the sleeve 55, antifriction bearings 94 being interposed between the cam member and sleeve.

As shown in Figure 5b, the cam sleeve 93 is provided with a conical cam lobe 93a on one side, normally on the same side of the fore and aft axis as the wing which is retracting during forward movement of the craft. The cam 93 is illustrated as rotated 90° from the position normally assumed for forward or reverse movement of the helicopter. Diametrically opposite the cam 93a and at the upper end of the sleeve is another shorter conical cam lobe 93b having the same inclination but reversed with respect to the lobe 93a. Cam lobe 93b is similar to cam lobe 93a, except of a height comparable with the desired reverse speed. With this arangement, as the rotor 27 rotates, and with the cam sleeve 93 in the axial position shown, the cam follower rollers 92 on the wing 27a and on the wing 27b will merely roll around a cylindrical portion of the sleeve 93 between the cam lobes 93a and 93b. If the cam sleeve 93 is moved upwardly so that the cam rollers 92 engage a portion of the cam lobe 93a, the cam follower roller 92 at the left hand side of the device, as viewed in Figure 5b, will be moved outwardly slightly, thereby moving the shaft 73 inwardly and projecting the propeller blade 70 out of the section of the wing 27b. As the rotor 27 continues to rotate, the cam follower roller 92 associated with the wing 27a will pass over the cam lobe 93a and will project the propeller blade 70 carried by that wing.

As the cam sleeve 93 is moved up further, for example, to maximum elevation, the cam follower roller 92 engaging the cam lobe 93a will be deflected outwardly a greater distance, thereby projecting the propeller blade 70 associated therewith farther from the wing. In this way, the reaction of the propeller blade can be varied in order to control the speed or turning movement of the helicopter. Moreover, the amount of lift of the wing can be varied considerably.

The cam lobe 93b is utilized for causing the helicopter to move backwardly inasmuch as it is on the opposite side of the sleeve 93 from the cam lobe 93a. Thus, when the cam follower roller 92 engages the cam lobe 93b, the propeller blade 70 at the right-hand side of the arc of rotation, as viewed in Figure 5b, will be projected during forward movement of the blade (i. e., with respect to the normally forward end of the body), causing the helicopter to move in the opposite direction to what it is moved when the cam follower roller 92 engages with the cam lobe 93a.

Usually it will be unnecessary to provide springs or other additional mechanism for urging the cam follower roller 92 against the cam sleeve 93. As described above, centrifugal force acts to move the shaft 73 outwardly to retract the blade 70. Outward movement of the shaft 73 urges the roller 92 toward the cam sleeve 93. Moreover, the propeller blade 70 is aranged so as to be urged toward retracted position by the reaction of the air against its surface. These two forces are sufficient to cause the cam roller 92 to follow the contours of the cam sleeve 93 under all operating conditions.

The cam sleeve 93 is secured at its upper end to a cup-shaped member 95 which, in turn, is secured to the upper end of a tubular shaft 96 that extends downwardly inside the pitch varying tube 63 and terminates beneath the transmission housing 25. As shown in Figures 4a and 5a, the shaft 96 is slidably and rotatably mounted in a cup-shaped casing 97 secured to the casing 25. The end of the shaft 96 may be enclosed in a cap member 97b secured to the casing 97. The lower end of the shaft 96 is provided with a flange 96a that is received in the channel of a ring 99 by means of which the shaft 96 can be moved axially, as will be described presently.

In addition to axial adjustment of the cam sleeves 93 and 100, these sleeves may be rotated relatively to the shafts to vary the positions at which the propeller blades 70 are projected and retracted.

As shown in Figures 5a, 22 and 24, the shaft 96 is splined to a worm gear 96b with capacity for relative axial movement so that the shaft 96 can be rotated by means of the worm 98 and shaft 98a journaled in the casing 97.

The cam follower rollers 92 on the rotor 28 cooperate with a cam sleeve 100 similar to the cam sleeve 93 and having cam lobes 100a and 100b thereon corresponding respectively to the cam lobes 93a and 93b, but reversed end for end from the position of the corresponding cam lobes on the sleeve 93. Thus, when the cam follower roller 92 associated with the wing 28a traverses the cam lobe 100a, the propeller blade 70 will be projected from the wing 28a on the opposite side of the shaft 46 from the propeller blade 70 on the wing 27b. The cam sleeve 100 is mounted so that upon downward movement, the extent of projection of the propeller blade 70 is increased. Upon upward movement of the cam sleeve 100, a reverse driving effect can be obtained by engagement of the cam follower rollers 92 with the cam lobe 100b.

The cam sleeve 100 is mounted upon a sleeve shaft 101 mounted externally of the drive shaft 46 and is slidably and rotatably received in an extension 102 at the upper end of the casing member 26, as shown in Figure 4a. The shaft 101 is provided with a flange 101a which is received in the channel of a ring 103 used for adjusting the shaft 101 axially, as will be described hereinafter.

Within the extension 102 is a worm 102a mounted on a shaft 102b that engages a worm gear 101b that is slidably, but non-rotatably splined to the shaft 101 (Figures 22 and 23). Rotation of the worm 98 or 102a will cause rotation of the corresponding shaft 96 or 101, thereby varying the position at which the propeller blades 70 carried by the rotors 27 and 28 are projected. This construction also permits balancing of the rotor torque, directional control and stabilizing of the helicopter as will be described hereinafter.

Figure 25:
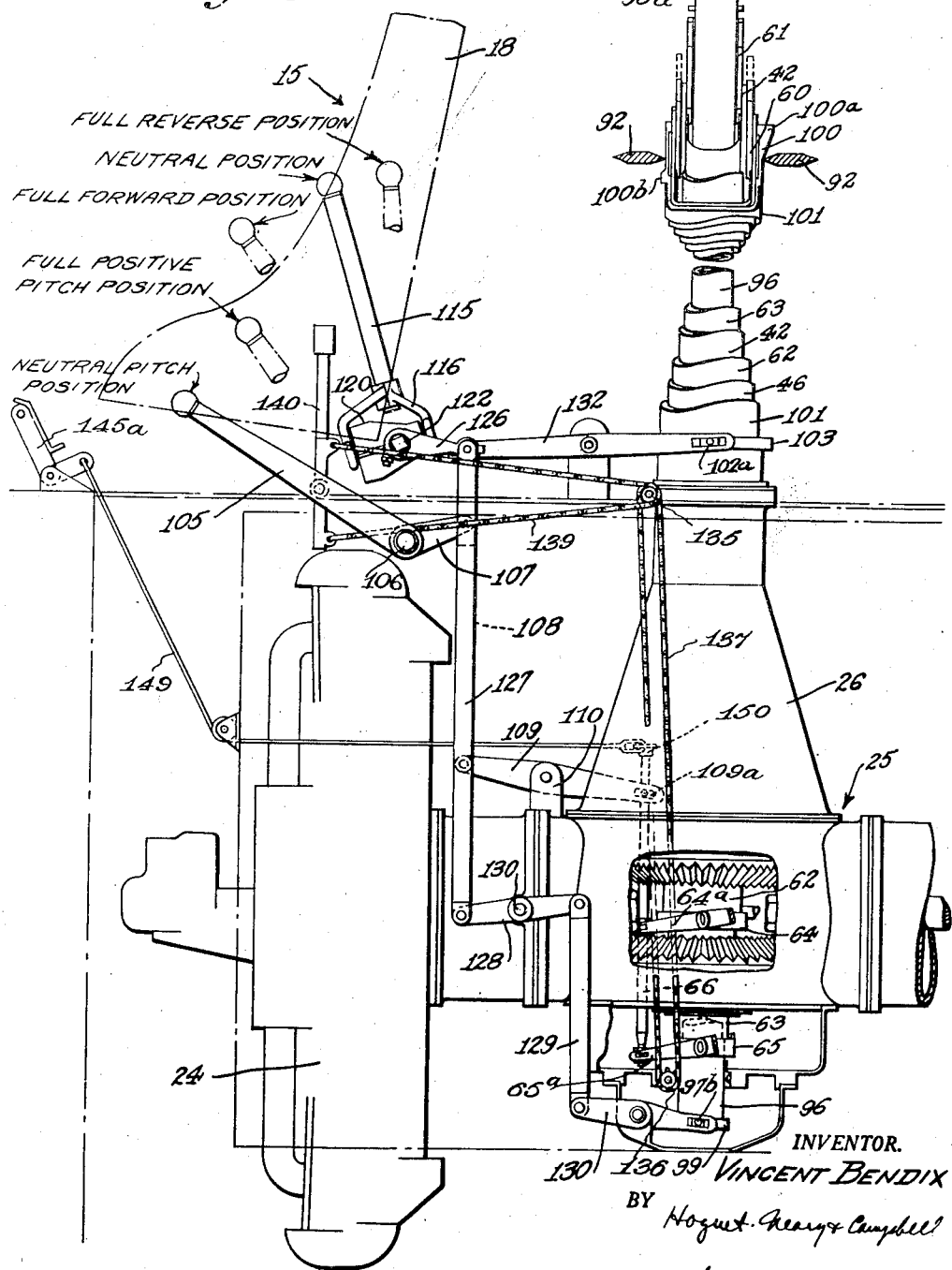
Figure 25 is a diagrammatic showing of the control system for the rotary wings and propeller blades.

In order to control the operation of the helicopter, I have provided a simplified control system, shown diagrammatically in Figure 25 of the drawings, and in greater detail in Figures 16 to 24. The control member for adjusting simultaneously the pitch of the wings of the rotors 27 and 28 and regulating the lift of the rotors is a lever 105 in the passenger compartment 15 of the body 10. As shown in Figures 16, 17 and 18, actually two levers 105 may be used, one on each side of the seats 18 so that an occupant of either seat can control the pitch of the wings. The levers 105 are connected by means of the shaft 106 so that they move simultaneously. The shaft 106 is supported in brackets 106a on the floor 16 and has a nearly centrally located short lever 107 which is connected by a link 108 to a lever 109 which is supported on a fulcrum 110 projecting upwardly from the transmission housing 25. The inner end of the lever 109 is provided with a sleeve 109a (Figs. 5a and 25) that receives the shaft 66 for rotation. Axial sliding movement of the shaft 66 and the sleeve 109a is prevented by means of the rings 66a fixed to the shaft 66 on opposite sides of the sleeve 109a. Thus, upon downward or counterclockwise movement of the pitch control lever 105, the rod 66 is moved downwardly, carrying the sleeves 60 and 61 therewith and rotating the wings 27a, 27b, 28a and 28b to a neutral pitch position. In this position, the wings can windmill or spin freely as the helicopter descends while continuing to rotate in the direction they are normally driven by the engines 23 and/or 24. As the pitch control lever 105 is pulled upwardly in a clockwise direction, the pitch of the wings of the rotors 27 and 28 changes toward a full positive pitch position, as indicated in Figure 25, providing for maximum lift.

The mechanism for controlling the speed and stability of the helicopter will now be described. This mechanism includes a control lever or stick 115 which is mounted for universal movement between the seats 18, 18 so as to be accessible to the occupant of either seat. The stick 115 has a yoke 116 at its lower end, as best shown in Figures 19 to 21. The yoke 116 has non-circular apertures 116a and 116b in its opposite ends which are adapted to receive the squared ends 117, 118 on the shaft 119. The shaft 119 is rotatably mounted in a casing 120 formed of two sections 120a and 120b (Figure 21) which are enlarged at one end to provide space for a bevel gear 121 on the shaft 119. The casing sections 120a and 120b are provided with split bearings 120c and 120d for receiving the shaft 119, as shown in Figure 20.

At right angles to the shaft 119 are disposed a pair of coaxial shafts 122 and 123 which are mounted in split bearings 120e and 120f in the casing sections 120a and 120b. The inner ends of the shafts 122 and 123 are rotatably received in the socket portions 120g and 120h in the casing 120. The shaft 122 is provided with a segmental gear 124 which meshes with the gear 121 and the shaft 123 is provided with a segmental gear 125, also meshing with the gear 121. With the arrangement described above, when the lever or stick 115 is rocked around the axis of the shafts 122 and 123, these shafts also rotate with the lever and the casing 120. When the lever or stick 115 is rocked around the axis of the shaft 119, the shafts 122 and 123 are rotated in opposite directions. The movements obtained by controlled movement of the stick 115 are utilized to control the speed of the helicopter and to maintain it in level flight.

Referring now to Figure 25, the shafts 122 and 123 are received in suitable bearing supports in the cabin of the helicopter to permit fore and aft rocking of the stick 115, the casing 120 and the shafts 122 and 123 about the axis of the shafts 122 and 123. The shaft 122 is provided with a lever 126 fixed to its end, this lever being connected by means of a link 127, a lever 128 pivotally mounted on part 30, a link 129 and another lever 130 journaled in part 97b to the ring 99 that is connected to the propeller control tube 96. Similarly, the shaft 123 is provided with a lever 131 fixed thereto which is connected by means of a lever 132 pivotally mounted on part 132a to the ring 103 that engages the sleeve shaft 101. Thus, when the lever is pushed forward to the dotted line position, identified as the "full forward" position, the sleeve shaft 101 is moved downwardly to a lower position, while the sleeve shaft 96 is moved upwardly to a higher position, thereby disposing higher portions of the cam lobes 100a and 93a in the path of the cam follower rollers 92 on the rotors 27 and 28.

When the control stick 115 is moved to the rear to the dotted line position, identified as full reverse position, the cam sleeves 93 and 100 are shifted, to bring the reverse cam lobes 93b and 100b into the path of rotation of the cam follower rollers 92.

The linkages are such that upon equal rocking of shafts 122 and 123 in opposite directions, tubes 96 and 101 are equally and oppositely displaced.

In order to compensate for or overcome tilting of the helicopter about its longitudinal axis, the stick 115 may be moved either to the right or left. When the stick is moved to the right, as viewed from the pilot's position, the shaft 119 is rocked counterclockwise, the lever 126 is moved clockwise, as viewed in Figure 25, and the lever 131 is moved counterclockwise, as viewed in Figure 25, thereby moving the shafts 96 and 101 equally downwardly. As a result, the cam lobe 100a is shifted to a position to cause the propeller blade associated therewith to exert a greater reaction while the effect of the propeller blade 70 associated with the cam lobe 93a is either decreased or the propeller blade is projected by the cam lobe 93b. In the latter case, the propeller blades 70 act against each other on the same side of the body 10 and cause greatly increased lift on the side at which they are projected. When the stick 115 is in neutral fore and aft position, movement of the stick to the right will cause both propeller blades on the wings at the left hand side of the cabin to be projected equally, thereby tilting the cabin to the right or correcting for a tilt to the left. Similarly, tilts to the right can be overcome by moving the stick 115 to the left.

Rotary movement of the cam sleeves 93 and 100 is used to stabilize he helicopter in a fore and aft direction or about the transverse axis. Thus, by adjusting the cam sleeves 93 and 100 to project the propeller blades on the rotors 27 and 28 simultaneously in the forward or rear arcs of the circle of rotation, an increased lift is given in that arc, thereby correcting for unbalance or pitching about the transverse arcs.

The mechanism for rotating the cam sleeves 93 and 100 is shown more particularly in Figures 22 to 25. Each of the worm shafts 102b and 98a is provided with a sprocket, 135 and 136, respectively, over which is passed an endless chain 137. The shaft 102b is provided with a second sprocket 138 for receiving a chain 139 that has its ends connected to a pitching control lever 140 on opposite sides of the pivot 141 on which the lever 140 is mounted. The worms 102a and 98 are so formed that upon forward movement of the lever 140, the shafts 96 and 101 are rotated in opposite directions to move the cam lobes 93a and 100a toward the rear. As a result, the propeller blades 70 are projected from the wings in the rear sectors of the circles of rotation and increased lift is obtained in these sectors thereby tending to nose the helicopter down or to correct for rearward pitch about the transverse axis. When the pitching control lever 140 is pulled back, the cam sleeves 93 and 100 are rotated forwardly, thereby causing the propeller blades 70 to exert greater lift in the forward sectors of the arc.

The helicopter may be steered or turned by differentially varying the pitch of the blades of the rotors 27 and 28. It will be apparent that when the wings of one of the rotors have a greater pitch than the wings of the other rotor, a greater thrust results from the rotor having the greater pitch. This unequal thrust tends to rotate the body 10 in a direction opposite to the direction of rotation of the rotor having the greater thrust. Advantage is taken of this action in the present helicopter.

As described above, the shaft 66 has oppositely threaded portions engaging the levers 64a and 65a so that rotation of the shaft will rock the levers toward or away from each other, thereby shifting the pitch control sleeves 60 and 61 in opposite directions, thereby increasing the pitch of the wings of one rotor and decreasing the pitch of the wing of the other rotor. Rotation of the shaft 66 is produced by means of two sets of foot pedals 145a, 145b and 146a and 146b (Figures 18 and 25).

The pedals 145a and 146a are connected by means of a shaft 147 and the pedals 145b and 146b are connected by means of the shaft 148. The shafts 147 and 148 are suitably journaled in bearings in the floor 16 of the body 10. Thus the pedals 145a and 146a move together while the pedals 145b and 146b move together.

The shaft 147 is provided with an arm 147a that is connected by a chain or cable 149 to one end of a tiller bar 150 fixed to the end of the shaft 66. The other end of the tiller bar 150 is connected by a chain or cable 151 to a lever 148a on the shaft 148. The relationship of the foot pedals to the shaft 66 is such that when the left hand pedal 145a or 146a is pushed forward the clockwise rotating rotor 27 is increased in pitch while the counterclockwise rotating rotor 28 is decreased in pitch. Due to torque reaction the body 10 of the helicopter is rotated counterclockwise or to the left in the forward direction of flight.

The helicopter will also turn to the right when the right hand pedal 145b or 146b is depressed.

From the preceding description of the controls of the helicopter disclosed herein, it will be clear that effective control of the helicopter about all of the three axes of movement can be maintained when the helicopter is in flight, is hovering or is descending either freely or under power. Moreover, the helicopter can be turned or caused to move in any desired direction with the engines not operating by controlling the action of the propeller blades 70 and the pitch of the wings. This directional control, while the rotors are autogyrating, provides a desirable safety factor not obtainable with other aircraft.

As shown in Figure 26, the cabin of the helicopter may be changed and rendered similar in appearance and function to the fuselage of a conventional aeroplane. Thus, the cabin 160 may have a rounded nose portion 161, having transparent panels extending from top to bottom, a passenger compartment 162 above the engines and around the drive shaft, an engine compartment 163 below the passenger compartment 162 and a rearwardly extended tail portion 164 having a rudder 165 and an elevator 166. The rudder and elevator can be controlled in any desired way, for example, by means of the foot pedals and the pitching control stick 140, if desired. These elements can be used in conjunction with the rotors 27 and 28 and the propeller blades 70 to control the direction of flight and the stability of the helicopter. In flight for example, the rudder can be used to steer the helicopter or to offset any tendency of the helicopter to turn when correcting for tilts and the elevator can be used for correcting for pitching of the helicopter in conjunction with the propeller blades 70.

From the preceding description, it will be apparent that helicopters of the type disclosed above have numerous advantages from the standpoint of manufacture and use. All of the controls, as well as the operating elements, are centralized and form a compact and extremely strong construction. Each of the various tubular shafts making up the driving and control elements of the helicopter tends to reinforce and strengthen the other elements against bending or distortion. Therefore, these tubes may be made of a weight and size commensurate with the power that they are to transmit and need not be made so heavy as to render the entire assembly unwieldly and of low load-carrying capacity.

The provision of overrunning clutches between the engines and the rotors makes for increased safety inasmuch as the rotors 27 and 28 can be driven by one or both of the engines or can spin freely if both engines stop. Moreover, increased ease of starting can be accomplished by means of the starter which spins the rotors 27 and 28 before the engines are started, thereby relieving them of starting load.

A particular advantage of the power and transmission assembly described above is that a very low center of gravity can be obtained by locating the engines and transmission on the lower end of the drive shaft in spaced relationship to the planes of the rotors. In addition, it is most advantageous to have the engines below, from the standpoint of safety, rather than above, the passenger compartment.

It will be understood, of course, that the controls for varying the pitch of the wings and for controlling the operation of the propeller blades 70 can be modified considerably and that other mechanical equivalents than the mechanically movable tubular shafts may be used instead. Thus, hydraulic or electrical power transmitting systems may be substituted for the mechanical system disclosed herein without departing from the invention. Also, irreversible connections may be provided between the control sticks 105, 115, and 140 and their associated mechanisms so that they can be adjusted and will remain in adjusted positions. Moreover, the shape and size of the rotors may be modified, depending upon the size and load-carrying capacity of the helicopter and the position of the propeller blades may be altered to utilize the power of the engines most effectively, in propelling and stabilizing the device.

Accordingly, it should be understood that the above-described embodiments of the invention are illustrative and should not be regarded as limiting the scope of the following claims.

I claim:

1. In a helicopter, the combination of a pair of eccentric counter-rotatable drive shafts, a rotor mounted on each drive shaft, each rotor having a plurality of variable pitch wings, means for varying the pitch of the wings of said rotors selectively in the same or in the opposite sense, a propeller blade extending longitudinally of each wing, and means for intermittently projecting and retracting said propeller blade with respect to said wing.

2. In a helicopter, the combination of a pair of counter-rotating rotors each having a plurality of wings with longitudinally mounted movable blades, a plurality of vertical, concentric shafts comprising shafts for driving said rotors and control shafts movable relative to said drive shafts for changing the pitch of said wings and for moving the blades attached to said wings and operative connections between said wings and blades and said control shafts.

3. In a helicopter, the combination of a pair of counter-rotating rotors each having a plurality of wings, control blades extending longitudinally of and movable relatively to said wings and a plurality of vertical, concentric shafts comprising shafts for driving said rotors, and control shafts movable relative to said drive shafts for changing the pitch of said wings, and for moving the control blades, for the purpose of elevating, lowering and laterally moving said helicopter, and for controlling the stabilizing of the helicopter and operative connections between said wings and blades and said control shafts.

4. In a helicopter, the combination of a pair of concentric tubular drive shafts, means for rotating said drive shafts in opposite directions, a rotor fixed to each of said shafts, each rotor having at least two substantially radially extending wings, a propeller blade carried by and extending longitudinally of each wing and movable between a position in the wing and a position projecting from said wing blade, a pair of cam members spaced apart axially of and concentric with said drive shafts, each cam member having an axially tapered cam lobe, cam follower means carried by said rotors and engaging said cam members for moving said propeller blades between said positions in proportion to deflection of said cam follower means by said cam lobes, means interconnecting said cam follower means and said blades, tubular shafts concentric with said drive shafts fixed to said cam members, and unitary control means for moving said last mentioned tubular shafts selectively with relation to said drive shafts.

5. In a helicopter, the combination of a pair of concentric, tubular drive shafts, means for rotating said shafts in opposite directions, an upper rotor fixed to one of said drive shafts, a lower rotor fixed to the other drive shaft, each rotor having at least two wings, a propeller blade on each wing movable from a position in said wing to a position projecting from said wing, a third shaft within said drive shafts, a cam member on said third shaft adjacent to the uppermost rotor, an axially tapered cam lobe on said cam member, cam follower means engaging said cam member for projecting said propeller blades on said upper wings upon engagement with said cam lobe, a fourth tubular shaft concentric with and outside said drive shafts, a second cam member fixed to said fourth shaft and having an axially tapered cam lobe thereon in angularly spaced relation to the lobe on said third shaft cam member, cam follower means on the lower rotor engageable with said second cam member for projecting the propeller blades on the lower wings, and means for selectively adjusting said third and fourth shafts axially in the same or in opposite directions.

6. In a helicopter, the combination of a pair of counter-rotatable rotors having at least two variable pitch wings, control blades movably mounted in said wings, separate, concentric, counter-rotatable drive shafts supporting said rotors, pitch control shafts concentric with the drive shafts and rotatable therewith for varying the pitch of said wings, operative connections between the wings and said pitch control shafts, a screw-threaded member mounted for axial movement and non-rotatable relatively to each wing, means having screw-threaded engagement with said axially movable member for intermittently moving the control blades and means concentric with the drive shafts for intermittently moving said screw-threaded member to actuate said control blades.

7. In a helicopter, the combination of a pair of concentric, tubular drive shafts, means for rotating said shafts in opposite directions, a rotor having at least two variable pitch wings fixed at its midportion to each drive shaft for rotation therewith, means for varying the pitch of said wings, a propeller blade adjacent the end of each rotor wing movable from a retracted position substantially within the periphery of said wing to a position projecting from said wing. means for projecting and retracting said propeller blades of one of said rotors as they traverse an arc on one side of said drive shafts, means for projecting and retracting the propeller blades on the other rotor as they traverse an arc on the opposite side of said drive shafts, and means for shifting said arcs relative to one another.

8. In a helicopter, the combination of a pair of concentric tubular drive shafts, means for rotating said shafts in opposite directions, a rotor fixed to each drive shaft for rotation therewith, each rotor having at least two variable pitch substantially radially extending wings, means for varying the pitch of the wings of each rotor simultaneously, means for varying the pitch of the wings of one of said rotors relatively to the pitch of the wings of the other rotor, a propeller blade extending longitudinally of each of said rotor wings and movable between a position in said wing blade and a position projecting from the wing blade, and means for moving the propeller blades between said positions intermittently.

9. In a helicopter, the combination of a pair of concentric, tubular drive shafts, means for rotating said shafts in opposite directions, a variable pitch rotor fixed at its midportion to each drive shaft for rotation therewith, means for varying the pitch of said rotors selectively in the same or in the opposite senses, a propeller blade adjacent to each end of each rotor movable from a retracted position substantially within the periphery of said rotor to a position projecting from said rotor, spaced cam members adjacent to said rotors for projecting and retracting said propeller blades on said rotors, means connected to said propeller blades and engaging said cam members and means for adjusting said cams to vary the extent of projection of said propeller blades.

10. In a helicopter, the combination of a pair of concentric, tubular drive shafts, means for rotating said shafts in opposite directions, a variable pitch rotor fixed at its midportion to each drive shaft for rotation therewith, cam means for varying the pitch of said rotors selectively in the same or in opposite directions, a propeller control blade adjacent to each end of each rotor movable from a retracted position substantially within the periphery of said wing to a position projecting from said wing, spaced cam members adjacent to said rotors for projecting and retracting said control blades, cam followers operatively connected with said control blades and adapted to engage said cam members, and shafts concentric with said drive shafts for adjusting said cams to vary the extent of projection of said propeller blades.

11. In a helicopter, the combination of a frame, at least one engine supported in said frame, a transmission adjacent to said engine having a casing and a pair of gears connected to said engine, for rotation at equal speed in opposite directions, a passenger compartment above said engine, a first tubular drive shaft journaled in said casing and extending upwardly through said compartment and connected to one of said gears, a second tubular drive shaft concentric with said first shaft and connected to the other gear, a variable-pitch multiple wing rotor fixed to each of said shafts, control blades adjacent to the ends of said wings projectable from and retractable into said wings, control shafts concentric with said tubular drive shafts for varying the pitch of the wings of said rotors and for controlling the movements of said control blades and operative connections between said rotor wings and control blades and said control shafts.

12. In a helicopter, the subcombination of a rotary drive shaft, a hub fixed thereon having a plurality of substantially radially extending sockets, an elongated wing of aerodynamic cross-section rotatably mounted in each socket to permit variation of the pitch of the wing, an axially shiftable member concentric and rotatable with said shaft, having cam surfaces engageable with the wings for varying the pitch of said wings, means for shifting said member axially to vary the pitch of said wings, control blades adjacent the outer ends of said wings and forming a portion of the periphery of said wings, means supporting said control blades for relative movement to a position projecting from the wings, and relatively movable cam means concentric with said shaft for moving said control blades intermittently and cam followers operatively connected with said control blades and adapted to engage said cam means.

13. In a helicopter, the subcombination of a tubular drive shaft, a hub fixed to said shaft having a plurality of substantially radially extending sockets, an elongated wing for each socket, said wing having a tubular spar, one end of which is rotatably mounted in a socket to permit variation of the pitch of said wing, a cam member concentric and rotatable with and shiftable axially of said drive shaft having inclined cam slots therein, means on said wing spars extending into said cam slots, means for shifting said cam member axially to vary the pitch of said wings, propeller blades pivotally mounted on each wing and movable about an axis extending longitudinally of said wing from a position in said wing to a position projecting at an angle to the periphery of said wing, and means for moving said propeller blades intermittently.

14. In a helicopter, the subcombination of a tubular drive shaft, a hub fixed to said shaft having a plurality of substantially radially extending sockets, an elongated wing for each socket, each wing having a tubular spar, one end of which is rotatably mounted in a socket to permit variation of the pitch of said wing, a cam member concentric with, non-rotatable relatively to, and shiftable axially of said drive shaft having inclined cam slots therein, means on said wing spars extending into said cam slots, means for shifting said cam member axially to vary the pitch of said wings, propeller blades pivotally mounted on each wing and movable about an axis extending longitudinally of said wing to a position projecting at an angle to the periphery of said wing, means for actuating said propeller blades, and cam means engaging said last-named means, said cam means being concentric with said drive shaft and shiftable axially relatively thereto for moving said propeller blades intermittently.

15. In a helicopter, the combination of a pair of rotatable, concentric tubular drive shafts, a variable pitch, multiple wing rotor fixed to each of said shafts adjacent one end thereof, means at the other ends of said shafts for rotating them in opposite directions, separate tubular sleeves concentric with said drive shafts, means engaging said sleeves and connected to the wings of said rotors for varying the pitch of said wings, a control lever connected to said sleeves for shifting them to vary the pitch of said wings, propeller blades mounted on said wings for movement between a retracted position and a projected position outside said wings, separate cams concentric with said drive shafts and adjustable axially of said drive shafts, means engaging said cams and connected to said propeller blades for intermittently projecting said propeller blades to varying extents and retracting said propeller blades, tubular members concentric with said driveshafts fixed to said cams and adjustable axially of said shafts, and a universally movable lever connected to said members for moving said members simultaneously in the same direction and simultaneously in opposite directions.

16. In a helicopter, the combination of a pair of rotatable, concentric tubular driveshafts, a variable pitch multiple wing rotor fixed to each of said shafts adjacent one end thereof, means at the other ends of said shafts for rotating them in opposite directions, propeller blades mounted on the wing blades of said rotors for movement between a retracted position within the peripheries of said wing blades and a projected position outside said peripheries, separate cams concentric with said driveshafts, means engaging said cams and connected to said propeller blades and adjustable axially of said driveshafts for intermittently projecting to varying extents and retracting said propeller blades, shaft members concentric with said driveshafts fixed to said cams and adjustable axially of said shafts, and a universally movable lever connected to said members for moving said members simultaneously in the same direction and simultaneously in opposite directions.

17. In a helicopter, the combination of a pair of vertical tubular, concentric driveshafts, a multiple wing rotor fixed adjacent the upper end of each of said driveshafts for rotation therewith, means adjacent to the lower end of said driveshafts for rotating said shafts in opposite directions, a propeller blade adjacent the outer end of each motor wing movable to a position projecting from the blades, a cam member having an axially tapering lobe adjacent each rotor concentric with and disposed outside the corresponding tubular shaft, means connected to said propeller blades and engageable with said cam member to project said propeller blades intermittently, tubular sleeves concentric with said shafts fixed to said cam members, a control lever movable about two right angularly related axes, and means connecting said lever to said tubular sleeves to move said sleeves relatively axially upon movement of said lever about one of said axes, and move said sleeves equally and in the same direction upon movement of the lever about the other axis.

18. The combination set forth in claim 17 in which the means connecting the lever to said sleeves comprises a casing having a first shaft therein connected to said lever, a gear on said shaft, second and third aligned shafts projecting into said casing from opposite sides at a right angle to the first shaft, gears on said second and third shafts meshing with the gear on the first shaft, and levers on said second and third shafts connected to different sleeves.

19. In a helicopter, the combination of a pair of concentric driveshafts, a multiple wing, variable pitch rotor fixed to each driveshaft, means for rotating said driveshafts in opposite directions, a first pitch varying shaft concentric and rotatable with and shiftable axially of one of said driveshafts, a second pitch varying shaft concentric and rotatable with, and shiftable axially of, the other driveshaft, means engaging said pitch varying shafts and connected to the wings of said rotors, means for shifting said pitch varying shafts simultaneously in the same axial direction for varying the pitch of the wings in the same sense, and means for shifting the pitch varying shafts axially in opposite directions to vary the pitch of the wings of one rotor relatively and in the opposite sense to the pitch of the wings of the other rotor.

VINCENT BENDIX.

REFERENCES CITED

The following references are of record in the file of this patent:

UNITED STATES PATENTS

| Number | Name | Date |
|---|---|---|
| 1,084,806 | Lister | Jan. 20, 1914 |
| 1,272,846 | Perry | July 16, 1918 |
| 1,345,101 | Perry | June 29, 1920 |
| 1,350,456 | Hewitt | Aug. 24, 1920 |
| 1,403,624 | Pescara | Jan. 17, 1922 |
| 1,449,129 | Pescara | Mar. 20, 1923 |
| 1,546,313 | Pescara | July 14, 1925 |
| 1,592,740 | MacNeil | July 13, 1926 |
| 1,836,406 | Smith | Dec. 15, 1931 |
| 1,869,326 | Ludlow | July 26, 1932 |
| 1,891,384 | Gillis et al. | Dec. 20, 1932 |
| 1,896,511 | Goldman | Feb. 7, 1933 |
| 1,919,089 | Breguet | July 18, 1933 |
| 1,938,091 | Wick | Dec. 5, 1933 |
| 1,896,709 | Breguet et al. | Jan. 1, 1935 |
| 2,023,760 | Dornier | Dec. 10, 1935 |
| 2,229,153 | Ware | Jan. 21, 1941 |
| 2,232,289 | Upson | Feb. 18, 1941 |
| 2,232,683 | Lloyd | Feb. 25, 1941 |
| 2,271,473 | Bennett | Jan. 27, 1942 |
| 2,305,454 | Nalligner | Dec. 15, 1942 |
| 2,308,802 | Barling | Jan. 19, 1943 |
| 2,310,220 | Michelis | Feb. 9, 1943 |
| 2,381,596 | Jensen | Aug. 7, 1945 |
| 2,427,936 | Wales | Sept. 23, 1947 |

FOREIGN PATENTS

| Number | Country | Date |
|---|---|---|
| 125,202 | Germany | Nov. 22, 1901 |
| 610,434 | Germany | Mar. 12, 1935 |
| 695,918 | Germany | Sept. 5, 1940 |